US006980130B2

(12) United States Patent
Kusayanagi et al.

(10) Patent No.: US 6,980,130 B2
(45) Date of Patent: Dec. 27, 2005

(54) EMERGENCY REPORTING DEVICE

(75) Inventors: Yoshinori Kusayanagi, Kamakura (JP); Miho Kido, Sagamihara (JP)

(73) Assignee: Nissan Motor Co., Ltd., Kanagawa (JP)

( * ) Notice: Subject to any disclaimer, the term of this patent is extended or adjusted under 35 U.S.C. 154(b) by 310 days.

(21) Appl. No.: 10/673,198

(22) Filed: Sep. 30, 2003

(65) Prior Publication Data
US 2004/0077330 A1   Apr. 22, 2004

(30) Foreign Application Priority Data
Oct. 21, 2002   (JP)   .............................. 2002-306336

(51) Int. Cl.[7] .......................................... G08G 1/123
(52) U.S. Cl. ................ 340/988; 340/905; 340/995.13; 340/995.21; 455/11.1; 701/209; 701/210
(58) Field of Search .................. 340/988, 995.13, 340/995.19, 995.21, 995.27, 426.2, 426.19, 340/426.21, 905; 701/201, 208, 209, 210, 701/213, 300; 455/11.1, 5, 7, 445, 518, 411

(56) References Cited
U.S. PATENT DOCUMENTS 4,539,706 A * 9/1985 Mears et al. ............... 455/11.1
4,706,086 A * 11/1987 Panizza ...................... 340/902
5,890,054 A * 3/1999 Logsdon et al. ........... 455/11.1
6,236,337 B1 * 5/2001 Beier et al. ................. 340/905
6,647,244 B1 * 11/2003 Haymond et al. ......... 455/11.1
6,778,809 B2 * 8/2004 Morimoto .................. 455/11.1

FOREIGN PATENT DOCUMENTS
JP   2001-184581 A   7/2001

* cited by examiner

Primary Examiner—Brent A. Swarthout
(74) Attorney, Agent, or Firm—Shinjyu Global IP Counselors, LLP

(57) ABSTRACT

An emergency reporting device is configured to reduce the load of communication circuits of base stations when sending emergency signals. The emergency reporting device is configured to track the time in the travel time recording section from when a vehicle last exited a communication area of a base station until it detects a peripheral vehicle or track the time in the same manner for a peripheral vehicle as well. When the vehicle encounters a peripheral vehicle after receiving an emergency signal from an emergency vehicle, an exchange of travel information occurs between the two vehicles. The emergency reporting device determines whether or not to send the emergency signal held by the vehicle to the peripheral vehicle based on the travel information that was exchanged when the vehicles encountered each other.

18 Claims, 18 Drawing Sheets

US 6,980,130 B2

EMERGENCY REPORTING DEVICE

BACKGROUND OF THE INVENTION

1. Field of the Invention

The present invention relates to an emergency reporting device that sends an emergency signal to a base station to indicate an emergency situation of a vehicle.

2. Background Information

An example of a conventional emergency reporting device is disclosed in Japanese Laid-Open Patent Publication No. 2001-184581. In the conventional emergency reporting device disclosed in this publication, when an emergency vehicle having an emergency situation is outside of a communication area of a base station and issues an emergency signal, the emergency signal is relayed between a plurality of peripheral vehicles using vehicle-to-vehicle communication. Then, the emergency signal is finally sent to a vehicle that is within a communication area of a base station and that vehicle passes on the emergency signal to the base station.

In view of the above, it will be apparent to those skilled in the art from this disclosure that there exists a need for an improved emergency reporting device. This invention addresses this need in the art as well as other needs, which will become apparent to those skilled in the art from this disclosure.

SUMMARY OF THE INVENTION

It has been discovered that, in the conventional emergency reporting device described in the above publication, the emergency signal issued from the emergency vehicle is sent to all the peripheral vehicles that are at a distance where transmission is reachable from the emergency vehicle. Then, each of the peripheral vehicles which received that emergency signal relays the signal to other vehicles. Thus, the number of transmissions of the emergency signal increases greatly and the load on the communication lines of the base station increases.

One of the objects of the present invention is to solve this type of conventional problems described above. Thus, the present invention includes an objective of providing an emergency reporting device that reduces the load on the communication lines of the base station when sending the emergency signal.

In order to achieve the above-mentioned objective, an emergency reporting device to be installed in a vehicle is provided that comprises a base station communication section, a vehicle communication section, and an emergency signal control unit. The base station communication section is configured and arranged to communicate with one of a plurality of base stations and send an emergency signal to the one of the base stations after entering a communication area of the one of the base stations with the emergency signal. The vehicle communication section is configured and arranged to communicate with a peripheral vehicle to receive travel information of the peripheral vehicle. The emergency signal control unit includes a travel information acquisition section, a peripheral vehicle detection section, and a transmission determination section. The travel information acquisition section is configured to acquire travel information of the vehicle. The peripheral vehicle detection section is configured to detect the peripheral vehicle equipped with the emergency reporting device in a peripheral area of the vehicle. The transmission determination section is configured to determine whether or not to send the emergency signal to the peripheral vehicle based on a comparison of the travel information of the vehicle and the travel information of the peripheral vehicle. The vehicle communication section is further configured and arranged to send the emergency signal to the peripheral vehicle based on a determination result of the transmission determination section.

According to the present invention, when a vehicle stores an emergency signal and passes by a peripheral vehicle outside a communication area of a base station, a determination is made to either send or not to send the emergency signal based on travel information after the vehicle and the peripheral vehicle exited last communication areas. In other words, the emergency reporting device in accordance with the present invention estimates which of the vehicle or the peripheral vehicle will most likely enter into a communication area first based on how the vehicle and the peripheral vehicle have been traveling after exiting the communication areas. And then the emergency reporting device of the present invention determines whether or not to send the emergency signal from the vehicle to the peripheral vehicle. Consequently, the emergency signal is not sent out randomly to peripheral vehicles but is held in a vehicle that is presumed to most likely enter into a communication area of a base station first. Then, the emergency signal is sent to a base station from the vehicle holding the emergency signal when that vehicle enters into a communication area of the base station. This arrangement of the emergency reporting device of the present invention eliminates the need to send the emergency signal to many vehicles in order to quickly convey the emergency signal to the base station. Therefore, the load on the communication lines of the base station when sending the emergency signal can be reduced.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
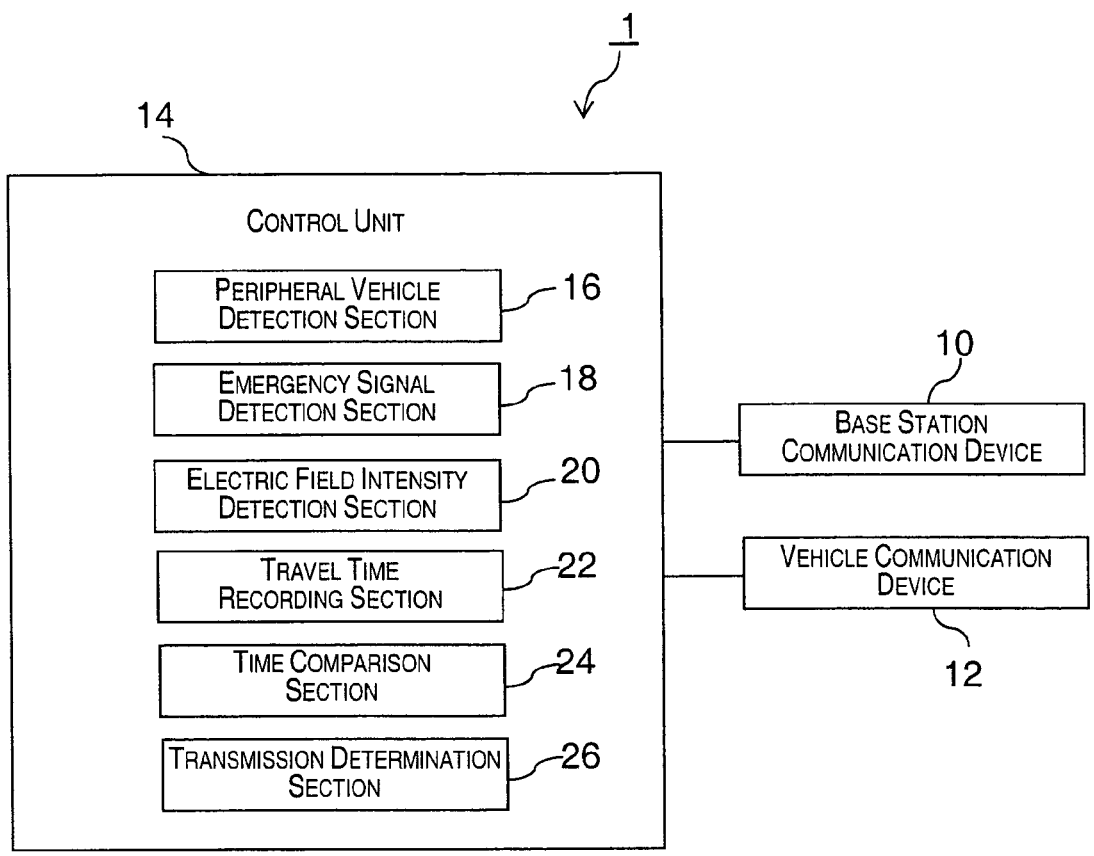
FIG. 1 is a block diagram showing a configuration of an emergency reporting device in accordance with a first embodiment of the present invention.

Referring initially to FIG. 1, an emergency reporting device 1 is illustrated in accordance with a first embodiment of the present invention. FIG. 1 is a block diagram showing a configuration of the emergency reporting device 1 in accordance with the first embodiment of the present invention. The emergency reporting device 1 is adapted to be mounted on a plurality of vehicles. However, for the sake of brevity, the present invention will be explained using only two vehicles equipped with the emergency reporting device 1, i.e., a vehicle 100 and a peripheral or oncoming vehicle 110. Thus, the configuration and structure of the emergency reporting device 1 are explained as it is installed in the vehicle 100. It will be apparent to those skilled in the art from this disclosure that the emergency reporting device 1 is installed in other vehicles such as the peripheral vehicle 110 in the same manner as the emergency reporting device 1 is installed in the vehicle 100. In other words, each of the emergency reporting devices 1 is operatably coupled to a vehicle on which the each of the emergency reporting devices 1 is installed.

Here, the peripheral vehicle 110 is explained by using an example of an oncoming vehicle 110 that travels towards the vehicle 100 on an opposite lane of a road on which the vehicle 100 is travelling. Of course, it will be apparent to those skilled in the art from this disclosure that the peripheral vehicle is not limited to an oncoming vehicle. The peripheral vehicle can be any vehicle that is in a peripheral area of the vehicle 100.

When the emergency reporting device 1 installed in the vehicle 100 receives an emergency signal from an emergency vehicle 120 when the vehicle 100 is not within a communication area of a base station and passes by the oncoming vehicle 110, the emergency reporting device 1 is configured and arranged to determine whether or not to send the emergency signal to the oncoming vehicle 110.

More specifically, in the first embodiment of the present invention, the emergency reporting device 1 is configured and arranged to determine which of the vehicle 100 and the oncoming vehicle 110 is more likely to enter into a communication area first by comparing a travel time T2 of the vehicle 100 with a travel time T1 of the oncoming vehicle 110. The travel time T2 is a time for which the vehicle 100 has traveled since the vehicle 100 exited a last communication area before the vehicle 100 passed by the oncoming vehicle 110. The travel time T1 is a time for which the oncoming vehicle 110 has traveled since the oncoming vehicle 110 exited a last communication area before the oncoming vehicle 110 passed by the vehicle 100. One of the vehicle 100 and the oncoming vehicle 110 that has a longer travel time is assumed to require a shorter travel time before entering a communication area again. In contrast, the other one of the vehicle 100 and the oncoming vehicle 110 that has a shorter travel time is assumed to require a longer travel time before entering a communication area again. Thus, depending on the comparison result of the travel times T1 and T2, the emergency reporting device 1 is configured and arranged to send or not to send the emergency signal to the oncoming vehicle 110 so that the emergency signal is transmitted to a base station quickly without sending the emergency signal to many vehicles.

As seen in FIG. 1, the emergency reporting device 1 basically comprises a base station communication device 10, a vehicle communication device 12 and a control unit 14. The base station communication device 10 of the emergency reporting device 1 is configured and arranged to communicate with a base station to provide mutual (two-way) communication between the base station and the vehicle 100 when the vehicle 100 is within a communication area of the base station. The vehicle communication device 12 is configured and arranged to provide mutual (two-way) communication between the vehicle 100 and other vehicles equipped with emergency reporting device 1 such as the oncoming vehicle 110 and the emergency vehicle 120 using a communication format such as DSRC (utilized in ETC).

The control unit 14 is configured and arranged to control operations of the base station communication device 10 and the vehicle communication device 12.

More specifically, the base station communication device 10 comprises a device such as a portable telephone or packet communication device. The base station communication device 10 is configured and arranged to send an emergency signal to the base station when the vehicle 100 is holding or storing the emergency signal for transmission upon the vehicle 100 entering into a communication area of the base station as described in more detail below.

The vehicle communication device 12 is configured and arranged to provide communication between the vehicle 100 and the emergency vehicle 120 that sends the emergency signal. Furthermore, the vehicle communication device 12 is configured and arranged to provide communication between the vehicle 100 and vehicles within a peripheral area of the vehicle 100 such as the oncoming vehicle 110. When the vehicle communication device 12 receives the emergency signal and the vehicle 100 passes by the oncoming vehicle 110 outside a communication area of a base station, the vehicle communication device 12 is configured and arranged to receive travel information of the oncoming vehicle 110 from the oncoming vehicle 110. Then, the emergency reporting device 1 is configured and arranged to determine whether or not to send the emergency signal to the oncoming vehicle 110 by speculating which one of the vehicle 100 and the oncoming vehicle 110 will first enter a communication area of a base station. When the control unit 14 determines to send the emergency signal to the oncoming vehicle 110, the vehicle communication device 12 is configured and arranged to send the emergency signal received from the emergency vehicle 120 to the oncoming vehicle 110. Now the oncoming vehicle 110 is responsible for sending the emergency signal to a base station upon entering a communication area of that base station. Thus, the vehicle 100 will not send the emergency signal to any other vehicles equipped with the emergency reporting device or to a base station.

The control unit 14 is configured and arranged to determine whether or not to send the emergency signal to the oncoming vehicle 110. Also, the control unit 14 is configured and arranged to control the transmission of the emergency signal to the oncoming vehicle 110 or to a base station. The control unit 14 preferably includes a microcomputer or CPU with a control program that controls the emergency reporting device as discussed below. The control unit 14 can also include other conventional components such as an input interface circuit, an output interface circuit, and storage devices such as a ROM (Read Only Memory) device and a RAM (Random Access Memory) device. The microcomputer of the control unit 14 is programmed to control the overall operation of the emergency reporting device 1. The control unit 14 is operatively coupled to the base station communication device 10 and the vehicle communication device 12 in a conventional manner. The internal RAM of the control unit 14 stores statuses of operational flags and various control data. It will be apparent to those skilled in the art from this disclosure that the precise structure and algorithms for controller 14 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Moreover, the control unit 14 preferably includes a peripheral vehicle detection section 16, an emergency signal detection section 18, an electric field intensity detection section 20, a travel time (acquisition) recording section 22, a time comparison section 24 and a transmission determination section 26. The peripheral vehicle detection section 16 is configured and arranged to detect the presence of peripheral vehicles, e.g., the oncoming vehicle 110, from communication result of the vehicle communication device 12.

The emergency signal detection section 18 is configured and arranged to detect the reception of emergency signals and notify a driver of the reception of the emergency signal. Moreover, the emergency signal detection section 18 is configured and arranged to store the received emergency signal.

The electric field intensity detection section 20 is configured and arranged to detect whether the vehicle 100 is within a communication area of a base station or not by detecting an electric field intensity from the base station. More specifically, the electric field intensity detection section 20 is configured and arranged to determine whether the detected electric field intensity from the base station is larger than a prescribed value. When the detected electric field intensity is equal to or less than the prescribed value, the electric field intensity detection section 20 is configured and arranged to determine that communication between the base station communication section 10 and the base station is not possible. In other words, the vehicle 100 is not within the communication area of the base station when the detected electric field intensely is equal or less than the prescribed value. Moreover, the electric field intensity detection section 20 is configured and arranged to notify the base station communication device 10 of whether or not the communication with the base station is possible. By continuously checking whether or not the vehicle 100 is within a communication area while the vehicle 100 is travelling, the electric field intensity detection section 20 is configured and arranged to determine whether the vehicle 100 has entered into or exited from a communication area of a base station.

The travel time recording section 22 is configured and arranged to record the travel information of the vehicle 100. More specifically, in the first embodiment of the present invention, the travel time recording section 22 is configured and arranged to start timing of the travel time T2 upon the electric field intensity detection section 20 determining that the vehicle 100 has exited from a communication area of a base station. The travel time recording section 22 is configured and arranged to end the timing of the travel time T2 when the oncoming vehicle 110 is detected by the peripheral vehicle detection section 16. The time comparison section 24 is configured and arranged to compare the travel information including the travel time T1 of the oncoming vehicle 110 received by the vehicle communication device 12 and the travel information including the travel time T2 of the vehicle 100 stored in the travel time recording section 22. The transmission determination section 26 is configured and arranged to determine whether or not to send the emergency signal held by the vehicle 100 to the oncoming vehicle 110 based on the comparison result in the time comparison section 24. However, if the emergency signal is not sent to the oncoming vehicle 10, then the travel timing recording section 22 is configured and arranged to continue recording the travel time from the point that the vehicle 100 last exited the last communication area until the emergency signal is sent to another peripheral vehicle of to a base station.

Next, referring to FIG. 2, the operation of the emergency reporting device 1 in accordance with the first embodiment of the present invention will be described in more detail.

Figure 2:
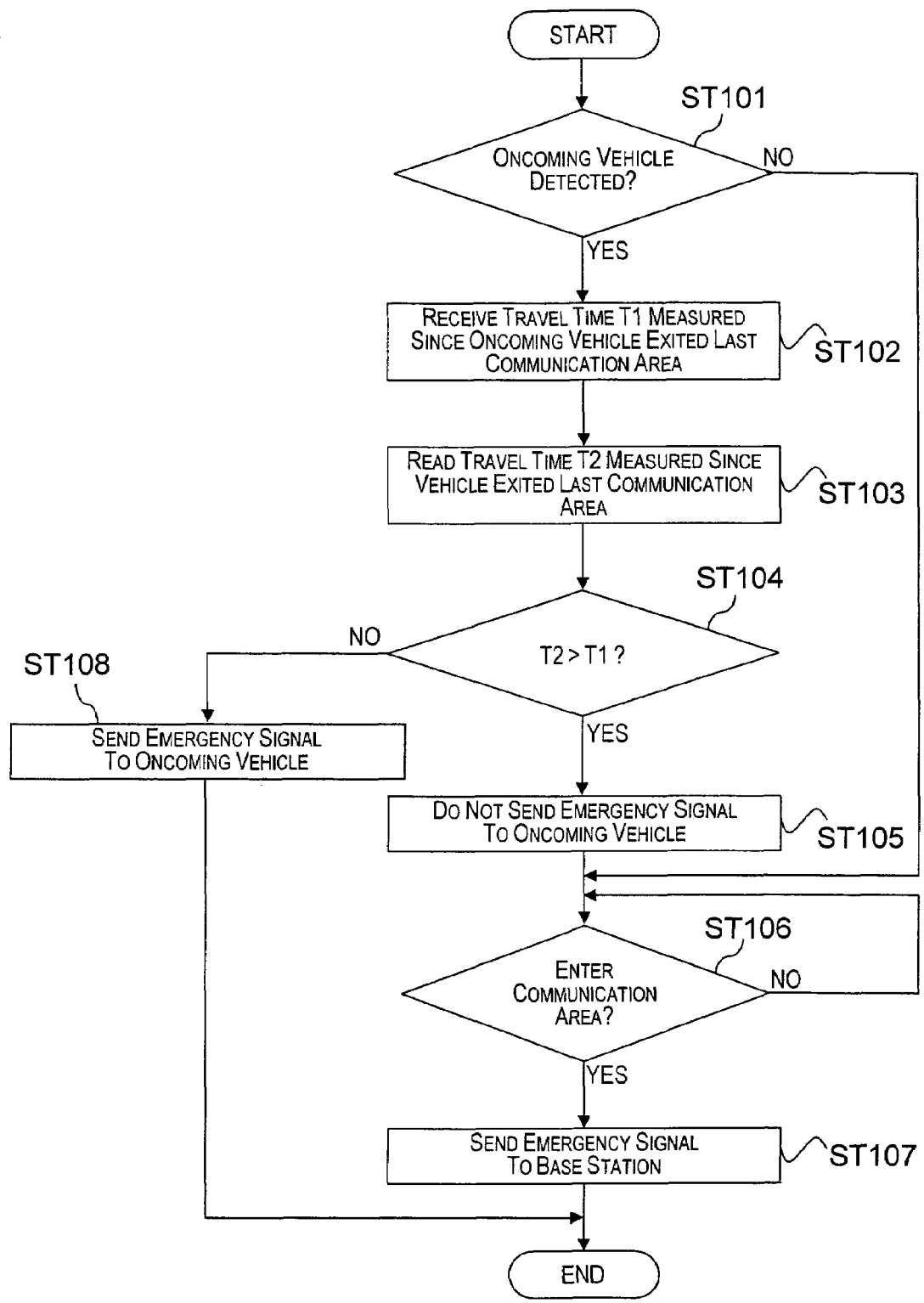
FIG. 2 is a flow chart showing an operation of the emergency reporting device in accordance with the first embodiment of the present invention.

FIG. 2 is a flow chart showing the operation of the emergency reporting device 1 in accordance with the first embodiment of the present invention. Prior to the processing shown in a flow chart in FIG. 2 starts, the travel time recording section 22 is configured and arranged to start timing of the travel time T2 when the vehicle 100 exits from a communication area of a base station. Then, the vehicle 100 passes close to the emergency vehicle 120. At this time, the vehicle communication device 12 is configured and arranged to receive an emergency signal from the emergency vehicle 120 and store the received emergency signal in the emergency signal detection section 18. Then, the processing that follows the flow chart shown in FIG. 2 is executed.

In step ST101 in FIG. 2, the peripheral vehicle detection section 16 is configured and arranged to first determine whether a peripheral vehicle (the oncoming vehicle 110) is detected. When the determination result is that the oncoming vehicle 110 is not detected (step ST101 is NO), the process proceeds to step ST106. When the determination result is that the oncoming vehicle 110 is detected (step ST101 is YES), the vehicle communication device 12 is configured and arranged to receive the travel information of the oncoming vehicle 110 in step ST102. The travel information of the oncoming vehicle 110 preferably includes the travel time T1 which is the time from when the oncoming vehicle 110 exited a last communication area until the oncoming vehicle 110 is detected by the emergency reporting device 1 of the vehicle 100. In other words, the travel time T1 is a travel time for which the oncoming vehicle 110 has been traveling outside a communication area of a base station. The travel time T1 is preferably timed by the travel time recording section 22 of the emergency reporting device 1 installed in the oncoming vehicle 110 in the same manner as the travel time T2.

In step ST103, the control unit 14 is configured and arranged to read the travel time T2 of the vehicle 100 from the travel time recording section 22. As explained above, the timing of the travel time T2 in the travel time recording section 22 has started after the vehicle 100 exiting a last communication area and ended when the emergency reporting device 1 of the vehicle 100 detected the oncoming vehicle 110. Accordingly, the travel time T2 is a travel time for which the vehicle 100 has been traveling outside a communication area of a base station.

In step ST104, the time comparison section 24 is configured and arranged to compare the travel time T1 of the oncoming vehicle 110 with the travel time T2 of the vehicle 100 to determine whether the travel time T2 of the vehicle 100 is longer than the travel time T1 of the oncoming vehicle 110.

In steps ST105 and ST108, the transmission determination section 26 is configured and arranged to determine whether or not to send the emergency signal to the oncoming vehicle 110 based on the determination result in step ST104. More specifically, when the determination result in step ST104 is that the travel time T2 of the vehicle 100 is longer than the travel time T1 of the oncoming vehicle 110 (step ST104 is YES), the transmission determination section 26 is configured and arranged to determine that the vehicle 100 is more likely to enter into a communication area before the oncoming vehicle 110 enters into a communication area. Thus, in step ST105, the transmission determination section 26 is configured and arranged not to send the emergency signal to the oncoming vehicle 110 and the emergency signal remains stored in the vehicle 100. In such a case, the processing proceeds to step ST106.

In step ST106, the electric field intensity detection section 20 is configured and arranged to determine whether the vehicle 100 has entered into a communication area of a base station. When the determination result in step ST106 is that the vehicle 100 has not entered into a communication area of a base station (step ST106 is NO), the processing of step ST106 is repeated until the vehicle 100 enters into a communication area of a base station. When the determination result in step ST106 is that the vehicle 100 has entered into a communication area of a base station (step ST106 is YES), the base station communication device 10 is configured and arranged to send the emergency signal held or stored by the vehicle 100 to the base station in step ST107. Then, the processing ends.

When the determination result in step ST 104 is that the travel time T2 of the vehicle 100 is not longer than the travel time T1 of the oncoming vehicle 110 (step ST104 is NO), the transmission determination section 26 is configured and arranged to determine that the oncoming vehicle 110 is more likely to enter into a communication area of the base station before the vehicle 100 enters a communication area of a base station. Thus, in step ST108, the control unit 104 is configured and arranged to send the emergency signal held by the vehicle 100 to the oncoming vehicle 110. The process then ends.

Accordingly, the transmission determination section 26 is configured and arranged to determine whether or not the vehicle 100 is likely to enter into a communication area before the oncoming vehicle 110 enters into a communication area using the comparison result obtained by the time comparison section 24. This determination is based on the positional relationship of the vehicle 100 and the oncoming vehicle 110 as shown in FIG. 3.

Figure 3:
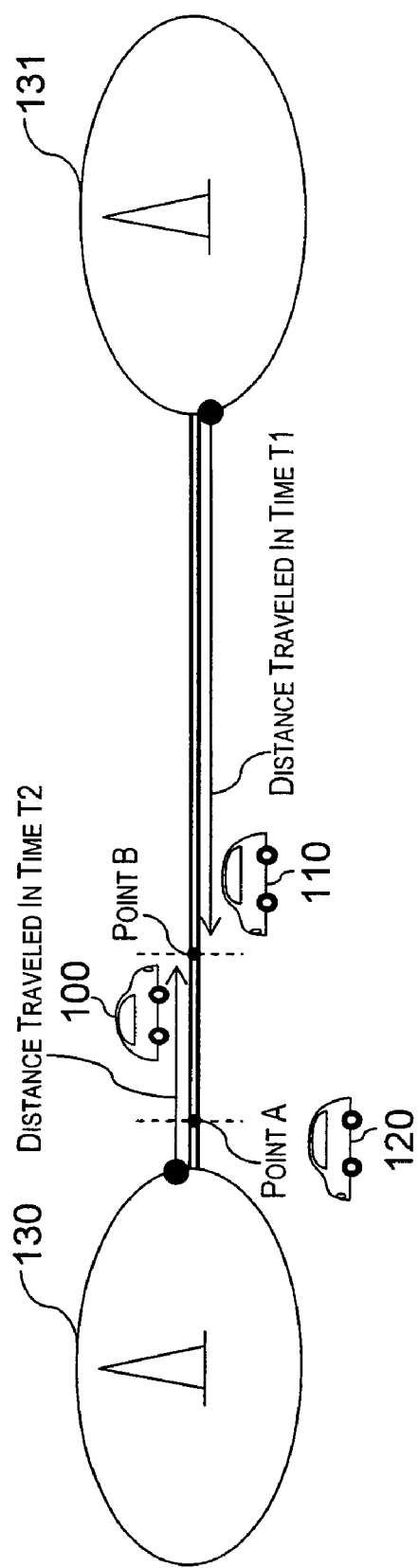
FIG. 3 is a schematic view showing the positional relationship of a vehicle and an oncoming vehicle when the emergency reporting device in accordance with the first embodiment of the present invention determines whether or not to send an emergency signal from the vehicle to the oncoming vehicle.

FIG. 3 is a schematic view showing the positional relationship of the vehicle 100 and the oncoming vehicle 110 when the transmission determination section 26 determines whether or not to send the emergency signal from the vehicle 100 to the oncoming vehicle 110. As seen in FIG. 3, a first communication area 130 of a first base station and a second communication area 131 of a second base station do not overlap, and thus, a non-communication area exists between the first communication area 130 and the second communication area 131. It is assumed in this explanation of the positional relationship of the vehicle 100 and the oncoming vehicle 110 that the vehicle 100 and the oncoming vehicle 110 are travelling toward each other on a road that is in the non-communication area. More specifically, the vehicle 100 is travelling in a direction from the first communication area 130 to the second communication area 131 on the road. The oncoming vehicle 110 is travelling in a direction from the second communication area 131 to the first communication area 130 on an opposite lane of the road extending between the first and second communication areas 130 and 131.

At first, the electric field intensity detection section 20 is configured and arranged to determine whether the vehicle 100 exited from the first communication area 130. When it is detected that the vehicle 100 exited the first communication area 130, the travel time recording section 22 is configured and arranged to start recording the travel time T2 of the vehicle 100 that indicates how long the vehicle 100 has been traveling outside the first communication area 130. Also, the emergency reporting device 1 is installed in the oncoming vehicle 110 in like manner to the vehicle 100 as discussed above. Thus, the travel time recording section 22 of the emergency reporting device 1 installed in the oncoming vehicle 110 is configured and arranged to start recording the travel time T1 when the oncoming vehicle 110 exits the second communication area 131.

Thereafter, the emergency signal detection section 18 of the vehicle 100 is configured and arranged to receive an emergency signal from the emergency vehicle 120 when the vehicle 100 passes by the emergency vehicle 120 at Point A in FIG. 3. The emergency signal is stored in the emergency signal detection section 18 of the emergency reporting device 1 of the vehicle 100. Then, the vehicle 100 and the oncoming vehicle 110 pass each other at Point B in FIG. 3 on the road.

At this time, the vehicle communication device 12 of the vehicle 100 is configured and arranged to send the travel information including the travel time T2 of the vehicle 100 timed after exiting the first communication area 130. Moreover, the vehicle communication device 12 of the vehicle 100 is configured and arranged to receive the travel information including the travel time T1 of the oncoming vehicle 110 timed after the oncoming vehicle 110 exited the second communication area 131.

Then, the time comparison section 24 of the vehicle 100 is configured and arranged to compare the travel time T2 of the vehicle 100 outside the first communication area 130 with the travel time T1 of the oncoming vehicle 110 outside the second communication area 131. When the travel time T2 of the vehicle 100 is shorter than the travel time T1 of the oncoming vehicle 110, the transmission determination section 26 of the vehicle 100 is configured and arranged to determine that the oncoming vehicle 110 will enter a communication area of a base station, i.e., the first communication area 130, sooner than the vehicle 100 enters into a communication area of a base station, i.e., the second communication area 131. In other words, the transmission determination section 26 determines that the oncoming vehicle 110 is more likely to enter into the first communication area 130 before the vehicle 100 enters into the second communication area 131 because the vehicle 100 has travelled for shorter period of time since the vehicle 100 exited the first communication area 130 than the oncoming vehicle 110 has travelled since the oncoming vehicle 110 exited the second communication area 131.

In particular, as shown in FIG. 3, when the vehicle 100 and the oncoming vehicle 110 are travelling on the same road towards each other, the travel time T2 of the vehicle 100 can be considered as the time required for the oncoming vehicle 110 to reach the first communication area 130. Similarly, the travel time T1 of the oncoming vehicle 110 can be considered as the time required for the vehicle 100 to reach the second communication area 131.

When the travel time T2 of the vehicle 100 is shorter than the travel time TI of the oncoming vehicle 110, the vehicle communication device 12 is configured and arranged to send the emergency signal to the oncoming vehicle 110 based on the determination result of the transmission determination section 26.

In contrast, when the travel time T2 of the vehicle 100 is longer than the travel time T1 of the oncoming vehicle 110, the transmission determination section 26 is configured and arranged to determine that the vehicle 100 is more likely to enter a communication area of a base station, i.e., the second communication area 131, before the oncoming vehicle 110 enters a communication area of a base station, i.e., the first communication area 130. Thus, the vehicle communication device 12 is configured and arranged not to send the emergency signal to the oncoming vehicle 110 so that the emergency signal remains stored in the emergency signal detection section 18 of the vehicle 100.

Figure 4:
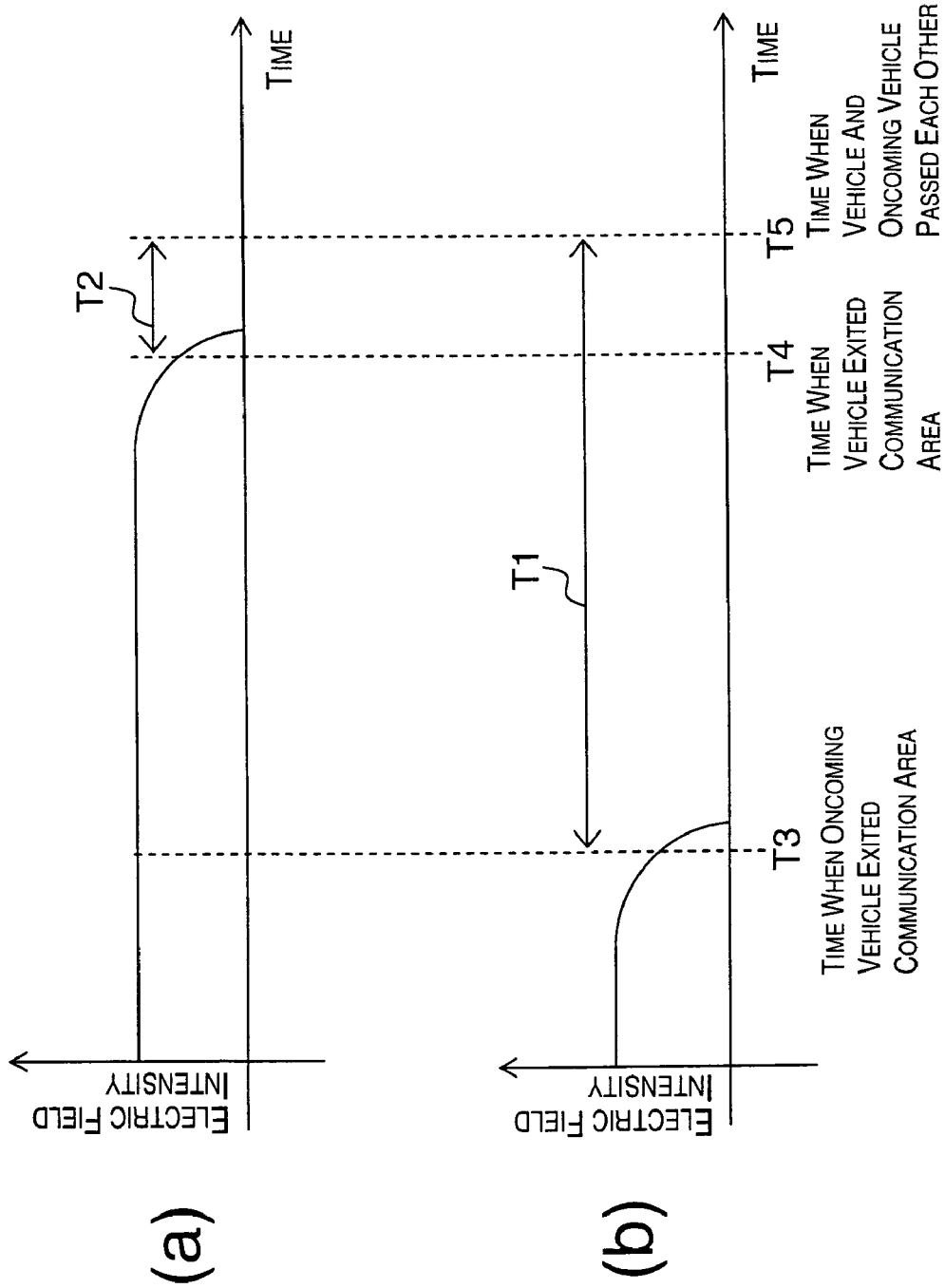
FIG. 4 is a chart showing changes in the detected electric field intensity of the vehicle (shown in graph (a)) and the oncoming vehicle (shown in graph (b)) in accordance with the first embodiment of the present invention.

Next, referring to FIG. 4, the relationship between the electric field intensities of the communication areas 130 and 131 detected by the electric field intensity detection sections 20 of the vehicles 100 and 110 and starting and ending the timing the travel time T1 or T2 by the travel time recording sections 22 will be described. The graph (a) of FIG. 4 is a chart showing changes in a detected electric field intensity of the first communication area 130 by the vehicle 100, while the graph (b) of FIG. 4 is a chart showing changes in a detected electric field intensity of the second communication area 131 by the oncoming vehicle 110. In FIG. 4, the ordinate is the electric field intensity and the abscissa of each graph is the time. The time axes of graphs (a) and (b) in FIG. 4 coincide.

At time T3 in FIG. 4, the electric field intensity detected by the electric field intensity detection section 20 of the oncoming vehicle 110 (shown in graph (b)) is equal to or less than the prescribed value. Thus, at this time, the electric field intensity detection section 20 of the oncoming vehicle 110 is configured and arranged to determine that communication between the base station in the communication area 131 and the base station communication device 10 of the oncoming vehicle 110 is not possible. Upon the determination of the electric field intensity detection section 20 that the communication between the base station and the base station communication section 10 is not possible, the travel time recording section 22 of the oncoming vehicle 110 is configured and arranged to start timing of the travel time T1.

Also, at time T4 in FIG. 4, the electric field intensity detected by the electric field intensity detection section 20 of the vehicle 100 (shown in graph (a)) is equal to or less than the prescribed value. At this time, the electric field intensity detection section 20 of the vehicle 100 is configured and arranged to determine that communication between the base station in the communication area 130 and the base station communication device 10 of the vehicle 100 is not possible. Upon this determination of the electric field intensity detection section 20, the travel time recording section 22 of the vehicle 100 is configured and arranged to start timing of the travel time T2. Then, the emergency reporting device 1 of the vehicle 100 receives the emergency signal from the emergency vehicle 120 after the time T4 and before time T5 in FIG. 4.

Then, at the time T5 in FIG. 4, the vehicle 100 and the oncoming vehicle 110 pass each other, and the peripheral vehicle detecting section 16 of the vehicle 100 is configured and arranged to detect the oncoming vehicle 110. Upon the detection of the oncoming vehicle 110, the travel time recording sections 22 installed in both the vehicles 100 and 110 are configured and arranged to end timing of travel time T2 and T1, respectively. The vehicle 100 and the oncoming vehicle 110 then communicate the travel information including the travel times T2 and T1 through the vehicle communicating devices 12 installed in the vehicle 100 and the oncoming vehicle 110. Since the vehicle 100 and the oncoming vehicle 110 pass each other in the non-communication area, the electric field intensities detected in both the vehicle 100 and the oncoming vehicle 10 are equal to or less than the prescribed value at the time T5.

Accordingly, the travel time T2 after the vehicle 100 exited the first communication area 130 is a period of time measured from time T4 to time T5 in FIG. 4. When the vehicle 100 and the oncoming vehicle 110 are travelling towards each other on the road as seen in FIG. 3, the travel time T2 is the time required for the oncoming vehicle 110 to reach the first communication area 130 after the oncoming vehicle 110 passes the vehicle 100.

Also, the travel time T1 after the oncoming vehicle 110 exited the second communication area 131 is a period of time measured from time T3 to time T5 in FIG. 4. When the vehicle 100 and the oncoming vehicle 110 are travelling toward each other on the road as shown in FIG. 3, the travel time T1 is the time required for the vehicle 100 to reach the second communication area 131 after the vehicle 100 passes the oncoming vehicle 110.

Accordingly, the emergency reporting device 1 in accordance with the first embodiment determines whether or not to send an emergency signal based on the travel information after the vehicle 100 and the peripheral vehicle (the oncoming vehicle 110) exited last communication areas. In other words, the emergency reporting device 1 is configured and arranged to estimate which of the vehicle 100 and the oncoming vehicle 110 enters into a communication area first and then determine whether or not to send the emergency signal from the vehicle 100 to the oncoming vehicle 110. Consequently, the emergency signal is not sent out randomly from the vehicle 100 but is held in one of the vehicle 100 and the oncoming vehicle 110 that is presumed to enter into a communication area of a base station first. When the one of the vehicle 100 and the oncoming vehicle 110 which is holding or storing the emergency signal enters into a communication area of a base station, the emergency signal is sent to the base station. This arrangement eliminates the need to send the emergency signal to many vehicles in order to quickly convey the emergency signal to the base stations. Therefore, the load on the communication lines of the base station when sending the emergency signal can be reduced.

Moreover, in the first embodiment of the present invention, the transmission determination section 26 of the emergency reporting device 1 is configured and arranged to determine whether or not to send the emergency signal from the vehicle 100 to the peripheral vehicle 110 by estimating which of the travel times of the vehicle 100 and the oncoming vehicle 110 will be longer before the vehicle 100 or the oncoming vehicle 110 reaches a communication area using the travel time T2 of the vehicle 100 and the travel time T1 of the oncoming vehicle 110. One of the vehicle 100 and the oncoming vehicle 110 that has a longer travel time is assumed to require a shorter travel time before entering a communication area again. In contrast, the other one of the vehicle 100 and the oncoming vehicle 110 that has a shorter travel time is assumed to require a longer travel time before entering a communication area again. In particular, when the vehicle 100 and the oncoming vehicle 110 are traveling on the same road towards each other, the travel time T2 of the vehicle 100 can be considered as the time required for the oncoming vehicle 110 to reach the communication area from which the vehicle 100 last exited. Similarly, the travel time of the oncoming vehicle 110 can be considered as the time required for the vehicle 100 to reach the communication area from which the oncoming vehicle 110 last exited. Consequently, with the emergency reporting device 1 in accordance with the first embodiment of the present invention, it is possible to reliably determine which of the vehicle 100 and the oncoming vehicle 110 enters into a communication area first based on the travel information of the vehicle 100 and the oncoming vehicle 110, e.g., the travel times T2 and T1.

Second Embodiment

Figure 5:
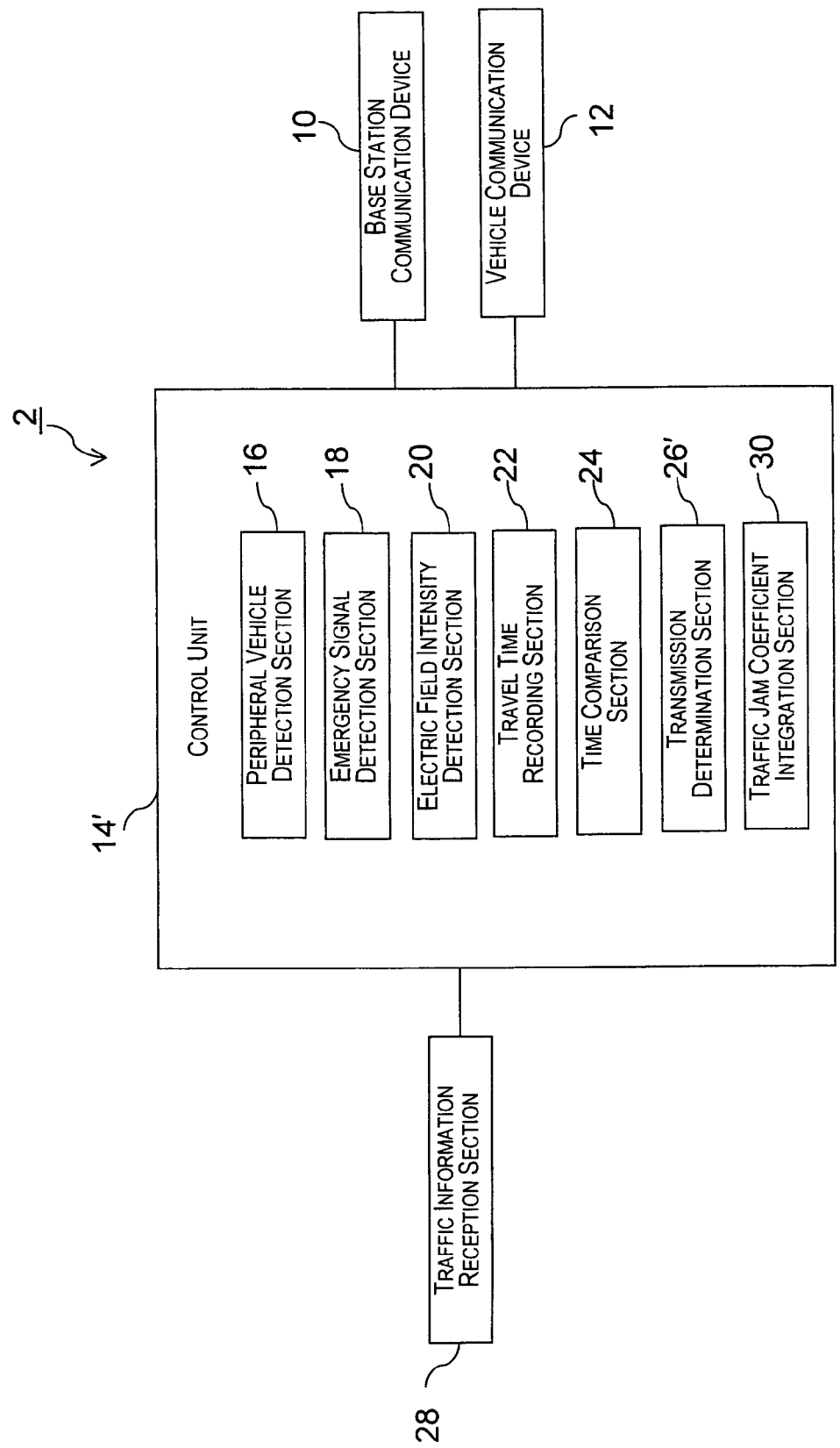
FIG. 5 is a block diagram showing a configuration of an emergency reporting device in accordance with a second embodiment of the present invention.
Figure 6:
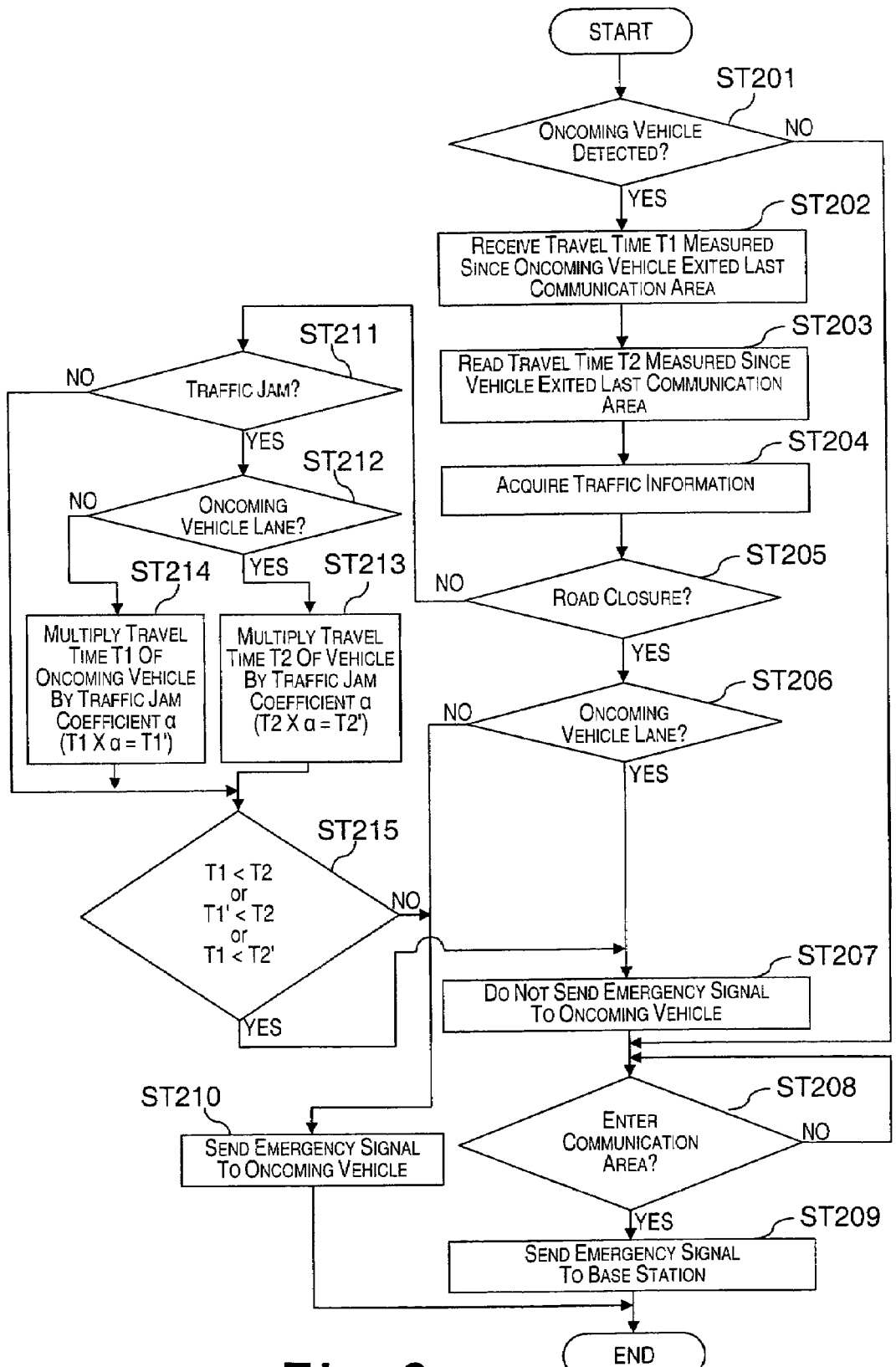
FIG. 6 is a flow chart showing an operation of the emergency reporting device in accordance with the second embodiment of the present invention.
Figure 7:
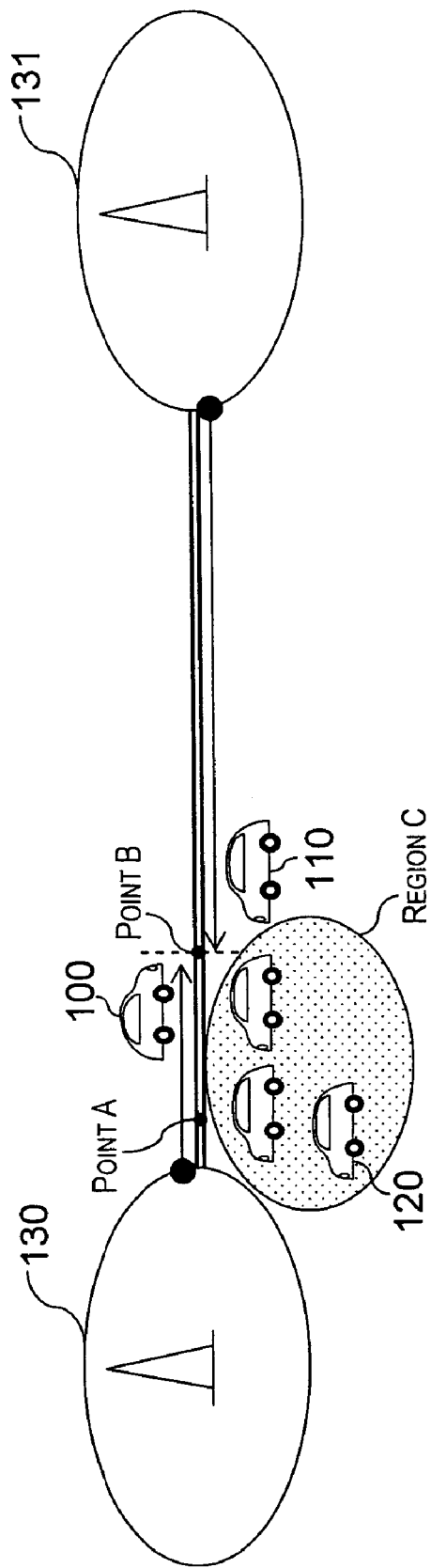
FIG. 7 is a schematic view showing the positional relationship of the vehicle and the oncoming vehicle when the emergency reporting device in accordance with the second embodiment of the present invention determines whether or not to send the emergency signal from the vehicle to the oncoming vehicle.

Referring now to FIGS. 5–7, an emergency reporting device 2 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a prime (').

FIG. 5 is a block diagram showing a configuration of the emergency reporting device 2 in accordance with the second embodiment of the present invention. As shown in FIG. 5, the emergency reporting device 2 of the second embodiment is identical to the emergency reporting device 1 of the first embodiment, except that the emergency reporting device 2 of the second embodiment further comprises a traffic information reception section 28, and the control unit 14' of the second embodiment further includes a traffic jam coefficient integration section 30 in addition to the composition of the emergency reporting device 1 of the first embodiment. The emergency reporting device 2 in accordance with the second embodiment can determine which of the vehicle 100 or the oncoming (peripheral) vehicle 110 enters into a communication area first with even more reliability based on the travel time and traffic information or traffic condition information such as road closure information and traffic jam information obtained from the traffic information reception section 28. In the second embodiment of the present invention, the oncoming vehicle 110 will be used as an example of a peripheral vehicle as well. Of course, it will be apparent to those skilled in the art from this disclosure that the peripheral vehicle is not limited to an oncoming vehicle. The peripheral vehicle can be any vehicle that is in a peripheral area of the vehicle 100.

The traffic information reception section 28 is configured and arranged to acquire traffic information containing traveling conditions, such as road closure information or traffic jam information on roads as well as any other road or traveling condition that effects travel time of a vehicle. The traffic information of the illustrated example preferably includes information related to traffic lanes where traffic road closure or traffic jams are occurring in addition to the road closure information and the traffic jam information. The traffic information is obtained by receiving radio waves of beacons or FM radios installed on roads. Then the traffic information reception section 28 is configured and arranged to send the traffic information to the control unit 14'. When it is determined that there is a road closure occurring on the road where the oncoming vehicle 110 is traveling in the direction ahead of the oncoming vehicle 110, the control unit 14' is configured and arranged to determine not to send the emergency signal to the oncoming vehicle 110. When it is determined that there is a road closure occurring on the road where the vehicle 100 is traveling in the direction ahead of the vehicle 100, the control unit 14' is configured and arranged to determine to send the emergency signal to the oncoming vehicle 110. When it is determined that there is a traffic jam on the road based on the traffic information from the traffic information reception section 28, the traffic jam coefficient integration section 30 of the control unit 14' is configured and arranged to execute a prescribed integration calculation based on the traffic jam information received from the traffic information reception section 28. More specifically, the traffic jam coefficient integration section 30 is configured and arranged to integrate the travel time T1 or T2 by a traffic jam coefficient a to obtain a compensated travel time T1' or T2', respectively.

Then, a transmission determination section 26' of the second embodiment is configured and arranged to take into a consideration the compensated travel time T2' or T1' obtained from the traffic jam coefficient integration section 30 when the transmission determination section 26' determines whether or not to send the emergency signal to the oncoming vehicle 110.

FIG. 6 is a flow chart showing the operation of the emergency reporting device 2 in accordance with the second embodiment of the present invention. Since steps ST201~ST203 shown in FIG. 6 are identical to steps ST101~ST103 of the first embodiment shown in FIG. 2, the description of the processing in these steps will be omitted. Moreover, in the second embodiment of the present invention, when step ST201 in FIG. 6 is NO, the process proceeds to step ST208.

In step ST204, the traffic information reception section 28 is configured and arranged to receive the traffic information. As explained above, the traffic information is the information that indicates an adverse traveling condition such as whether there is a traffic jam and whether there is a road closure in the road in the running direction of the vehicle 100 and the road in the running direction of the oncoming vehicle 110.

In step ST205, the control unit 14' is configured and arranged to determine whether or not a road closure is occurring based on the traffic information received from the traffic information reception section 28. When the determination result in step ST205 is that road closure is occurring (step ST205 is YES), the processing proceeds to step ST206. In step ST206, the control unit 14' is configured and arranged to determine whether or not the road closure is occurring in the lane where the oncoming vehicle 110 is located. When the determination result in step ST206 is that the road closure is occurring in the lane where the oncoming vehicle 110 is located (step ST206 is YES), the processing proceeds to step ST207. In step ST207, the transmission determination section 26' is configured and arranged to determine that the emergency signal cannot be sent to a base station if the emergency signal is sent from the vehicle 100 to the oncoming vehicle 110 because the road closure is occurring in the running direction of the oncoming vehicle 110. Thus, the vehicle communication device 12 is configured and arranged not to send the emergency signal held by the vehicle 100 to the oncoming vehicle 110.

Thereafter, the processing in steps ST208 and ST209 are executed and then the processing ends. The processing in steps ST208 and ST209 are identical to steps ST106 and ST107 of the first embodiment shown in FIG. 2.

When the determination result in step ST206 is that the road closure is not occurring in the lane where the oncoming vehicle 110 is located (step ST206 is NO), the transmission determination section 26' is configured and arranged to determine that the road closure is occurring in the lane where the vehicle 100 is located. Therefore, the transmission determination section 26' is configured and arranged to determine that the emergency signal cannot be sent to a base station if the emergency signal is held or stored in the vehicle 100 because the road closure is occurring in the running direction of the vehicle 100. Thus, in step ST210, the vehicle communication device 12 is configured and arranged to send the emergency signal held or stored by the vehicle 100 to the oncoming vehicle 110, then the processing ends.

When the determination result in step ST205 is that road closure is not occurring (step ST205 is NO), the processing proceeds to step ST211. In step ST211, the control unit 14' is configured and arranged to determine whether or not a traffic jam is occurring based on the traffic information received from the traffic information reception section 28. When the determination result in step ST211 is that a traffic jam is occurring (step ST211 is YES), the processing proceeds to step ST212. In step ST212, the control unit 14' is configured and arranged to determine whether or not the traffic jam is occurring in the lane where the oncoming vehicle 110 is located. When the determination result in step ST212 is that the traffic jam is occurring in the lane where the oncoming vehicle 110 is located (step ST212 is YES), the processing proceeds to step ST213. In step ST213, the traffic jam coefficient integration section 30 is configured and arranged to multiply the travel time T2 of the vehicle 100 by the traffic jam coefficient a to obtain the compensated travel time T2'. Here, the traffic jam coefficient α is a value larger than 1, e.g., 2, so that the compensated travel time T2' indicates a value that reflects any delay caused by the traffic jam. Of course, it will be apparent to those skilled in the art from this disclosure that the traffic jam coefficient α can be arranged such that the traffic jam coefficient α changes depending on the traffic jam conditions.

Here, the travel time T2 of the vehicle 100 is multiplied by the traffic jam coefficient α even though the traffic jam is occurring in the lane where the oncoming vehicle 110 is located but not in the lane where the vehicle 100 is located. This is because the compensated travel time T2' (the travel time T2 of the vehicle 100 multiplied by the traffic jam coefficient α) is assumed as the travel time for which the oncoming vehicle 110 will travel after the oncoming travel 110 passes the vehicle 100 before reaching the communication area from which the vehicle 100 last exited as taking into consideration any delays due to the traffic jam.

Then, in step ST215, the time comparison section 24 is configured and arranged to determine whether or not the compensated travel time T2' (the product of the travel time T2 of the vehicle 100 being multiplied by the traffic jam coefficient α) is longer than the travel time T1 of the oncoming vehicle 110. In other words, the time comparison section 24 is configured and arranged to determine whether or not the compensated travel time T2' indicative of the time the oncoming vehicle 110 will travel before entering into a communication area is longer than the travel time T1 the time the vehicle 100 will travel before entering into a communication area.

When the determination result in step ST215 is that the compensated travel time T2' (the product of the travel time T2 of the vehicle 100 being multiplied by the traffic jam coefficient α) is longer than the travel time T1 of the oncoming vehicle 110 (step ST215 is YES), the processing proceeds to ST207, and then the process ends as described above. When the determination result in step ST215 is that the compensated travel time T2' (the product of the travel time T2 of the vehicle 100 being multiplied by the traffic jam coefficient α) is not longer than the travel time T1 of the oncoming vehicle 110 (step ST215 is NO), the processing proceeds to ST210 and then the processing ends as described above.

In contrast, when the determination result in step ST212 is that the lane where the traffic jam is not occurring in lane where the oncoming vehicle 110 is located (step ST212 is NO), the processing proceeds to step ST214. In step ST214, the traffic jam coefficient integration section 30 is configured and arranged to multiply the travel time T1 of the oncoming vehicle 110 by the traffic jam coefficient α to obtain the compensated travel time T1'. Then, in step ST215, the time comparison section 24 is configured and arranged to determine whether or not the travel time T2 of the vehicle 100 is longer than the compensated travel time T1' (the product of the travel time T1 of the oncoming vehicle 110 being multiplied by the traffic jam coefficient α). When the determination result in step ST215 is that the travel time T2 of the vehicle 100 is longer than the compensated travel time T1' (step ST215 is YES), the processing proceeds to ST207, and then the processing ends as described above. When the determination results in step ST215 is that the travel time T2 of the vehicle 100 is not longer than the compensated travel time T1' (step ST215 is NO), the processing proceeds to ST210 and then the processing ends as described above.

When the determination result in step ST211 is that no traffic jam is occurring (step ST211 is NO), the time comparison section 24 is configured and arranged to compare the travel time T1 received from the oncoming vehicle 110 with the travel time T2 of the vehicle 100 in step ST215. Then, in step ST215, the time comparison section 24 is configured and arranged to determine whether or not the travel time T2 of the vehicle 100 is longer than the travel time T1 of the oncoming vehicle 110.

When the determination result in step ST215 is that the travel time T2 of the vehicle 100 is longer than the travel time T1 of the oncoming vehicle 110 (step ST215 is YES), the processing proceeds to step ST207, and then the processing ends as described above. When the determination result in step ST215 is that the travel time T2 of the vehicle 100 is not longer than the travel time T1 of the oncoming vehicle 110 (step ST215 is NO), the processing proceeds to step ST210 and the processing ends as described above.

Next, the positional relationship between the vehicle 100 and the oncoming vehicle 110 will be explained referring to FIG. 7. FIG. 7 is a schematic view showing the positional relationship between the vehicle 100 and the oncoming vehicle 110 when the emergency reporting device 2 in accordance with the second embodiment determines whether or not to send the emergency signal. In FIG. 7, the non-communication area exists between the first communication area 130 and the second communication area 131. The vehicle 100 and the oncoming vehicle 110 are travelling toward each other on the road that is in the non-communication area.

At first, the electric field intensity detection section 20 is configured and arranged to determine whether the vehicle 100 exited from the first communication area 130. When it is detected that the vehicle 100 exited the first communication area 130, the travel time recording section 22 is configured and arranged to start recording the travel time T2 of the vehicle 100 that indicates how long the vehicle 100 has been traveling outside the first communication area 130. Also, the emergency reporting device 2 is installed in the oncoming vehicle 110 in like manner to the vehicle 100. Thus, the travel time recording section 22 of the emergency reporting device 2 installed in the oncoming vehicle 110 is configured and arranged to start recording the travel time T1 when the oncoming vehicle 110 exits the second communication area 131.

Thereafter, the emergency signal detection section 18 of the vehicle 100 is configured and arranged to receive an emergency signal from the emergency vehicle 120 when the vehicle 100 passes by the emergency vehicle 120 at Point A in FIG. 7. The emergency signal is stored in the emergency signal detection section 18 of the emergency reporting device 2 of the vehicle 100. Then, the vehicle 100 and the oncoming vehicle 110 pass each other at Point B in FIG. 7 on the road.

At this time, the vehicle communication device 12 of the vehicle 100 is configured and arranged to send the travel information including the travel time T2 of the vehicle 100 timed after exiting the first communication area 130. Moreover, the vehicle communication device 12 of the vehicle 100 is configured and arranged to receive the travel information including the travel time T1 of the oncoming vehicle 110 timed after the oncoming vehicle 110 exiting the second communication area 131.

Then, the traffic information reception section 28 is configured and arranged to acquire the traffic information including the road closure information and the traffic jam information. Then, the control unit 14' is configured and arranged to determine whether or not a road closure or a traffic jam is occurring and whether the road closure and the traffic jam is in the running direction of the vehicle 100 or the running direction of the oncoming vehicle 110.

When the control unit 14' determines that there is a road closure in a region (region C in FIG. 7) which is on the side of the road where the oncoming vehicle 110 is running between the first communication area 130 and the point (point B) where the vehicle 100 and the oncoming vehicle 110 pass each other, the transmission determination section 26' is configured and arranged to determine that the oncoming vehicle 110 cannot enter into the first communication area 130 due to the road closure. Thus, the vehicle communication device 12 is configured and arranged not to send the emergency signal to the oncoming vehicle 110.

When the control unit 14' determines that a traffic jam is occurring in the region C in FIG. 7, the transmission determination section 26' is configured and arranged to determine that the oncoming vehicle 110 will not reach the first communication area 130 even after the oncoming vehicle 110 travels for the travel time T2 of the vehicle 100. Consequently, the traffic jam coefficient integration section 30 is configured and arranged to multiply the travel time T2 of the vehicle 100 by the traffic jam coefficient α to obtain the compensated travel time T2'. Then the time comparison section 24 is configured and arranged to compare the travel time T1 of the oncoming vehicle 110 with the compensated travel time T2' obtained from the traffic jam coefficient integration section 30.

When the compensated travel time T2' is not longer then the travel time T1 of the oncoming vehicle 110, the transmission determination section 26' is configured and arranged to determine that the oncoming vehicle 110 is more likely to enter into the first communication area 130 before the vehicle 100 enters into the second communication area 131. Thus, the vehicle communication device 12 is configured and arranged to send the emergency signal to the oncoming vehicle 110.

When the compensated travel time T2' is longer then the travel time T1 of the oncoming vehicle 110, the transmission determination section 26' is configured and arranged to determine that the vehicle 100 is more likely to enter into the second communication area 131 before the oncoming vehicle 110 enters into the second communication area 131. Then, the vehicle communication device 12 is configured and arranged not to send the emergency signal to the oncoming vehicle 110 so that the emergency signal remains held in the vehicle 100.

Accordingly, the emergency reporting device 2 in accordance with the second embodiment makes it possible to reduce the load on the communication lines of the base stations when sending emergency signals. Moreover, the emergency reporting device 2 can determine with even more reliability which of the vehicle 100 or the peripheral vehicle (oncoming vehicle 110) enters into a communication area first based on the traffic information as well as the travel information of the vehicle 100 and the oncoming vehicle 110.

Specifically, the transmission determination section 26' is configured and arranged to determine whether or not to send an emergency signal based on the road closure information of areas where road closures are occurring and the traffic jam information of areas where traffic jams are occurring as well as the travel information of the vehicle 100 and the oncoming vehicle 110. As a result, the travel times required for the vehicle 100 and the peripheral vehicle to reach communication areas can be estimated reliably. Accordingly, it is possible to determine with even more accuracy which of the vehicle 100 and the oncoming vehicle 110 is more likely to enter into a communication area first.

Third Embodiment

Referring now to FIGS. 8–11, an emergency reporting device 3 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a double prime (").

Figure 8:
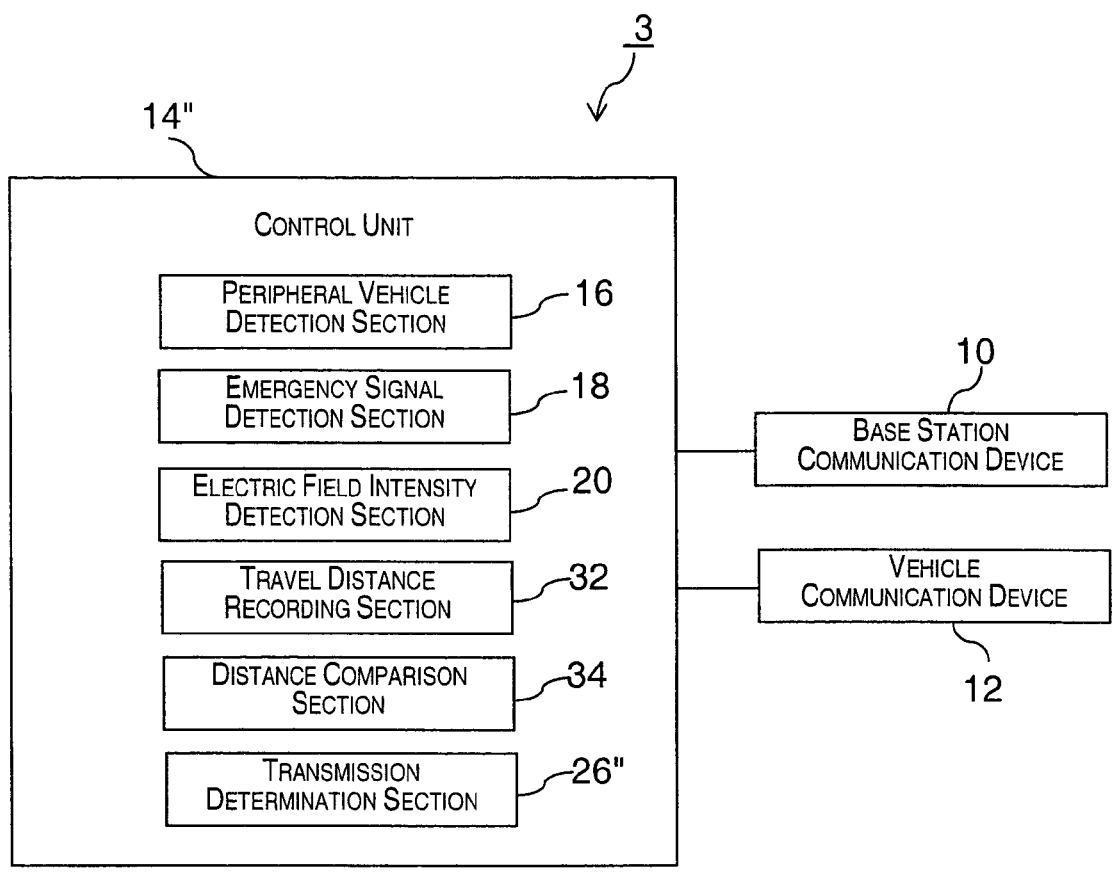
FIG. 8 is a block diagram showing a configuration of an emergency reporting device in accordance with a third embodiment of the present invention.

FIG. 8 is a block diagram showing a configuration of the emergency reporting device 3 in accordance with the third embodiment. As shown in FIG. 8, the emergency reporting device 3 of the third embodiment is identical to the emergency reporting device 1 of the first embodiment, except for a travel distance recording section 32 and a distance comparison section 34 are substituted for the travel time recording section 22 and the time comparison section 24, respectively. The travel distance recording section 32 is configured and arranged to store a travel distance L2 from a point where the electric field intensity detection section 20 determines that the vehicle 100 exited the communication area up to a point where a peripheral vehicle is detected by the peripheral vehicle detection section 16. The travel distance recording section 32 is included in the travel information acquisition section. The distance comparison section 34 is configured and arranged to compare a travel distance L1 of the peripheral vehicle outside the communication area and the travel distance L2 stored in the travel distance recording section 32. Consequently, the transmission determination section 26" is configured and arranged to determine whether or not to send an emergency signal held by the vehicle 100 to the oncoming vehicle 110 based on the comparison result of the distance comparison section 34. In the third embodiment of the present invention, the oncoming vehicle 110 will be used as an example of a peripheral vehicle as well. Of course, it will be apparent to those skilled in the art from this disclosure that the peripheral vehicle is not limited to an oncoming vehicle. The peripheral vehicle can be any vehicle that is on the periphery of the vehicle 100.

Figure 9:
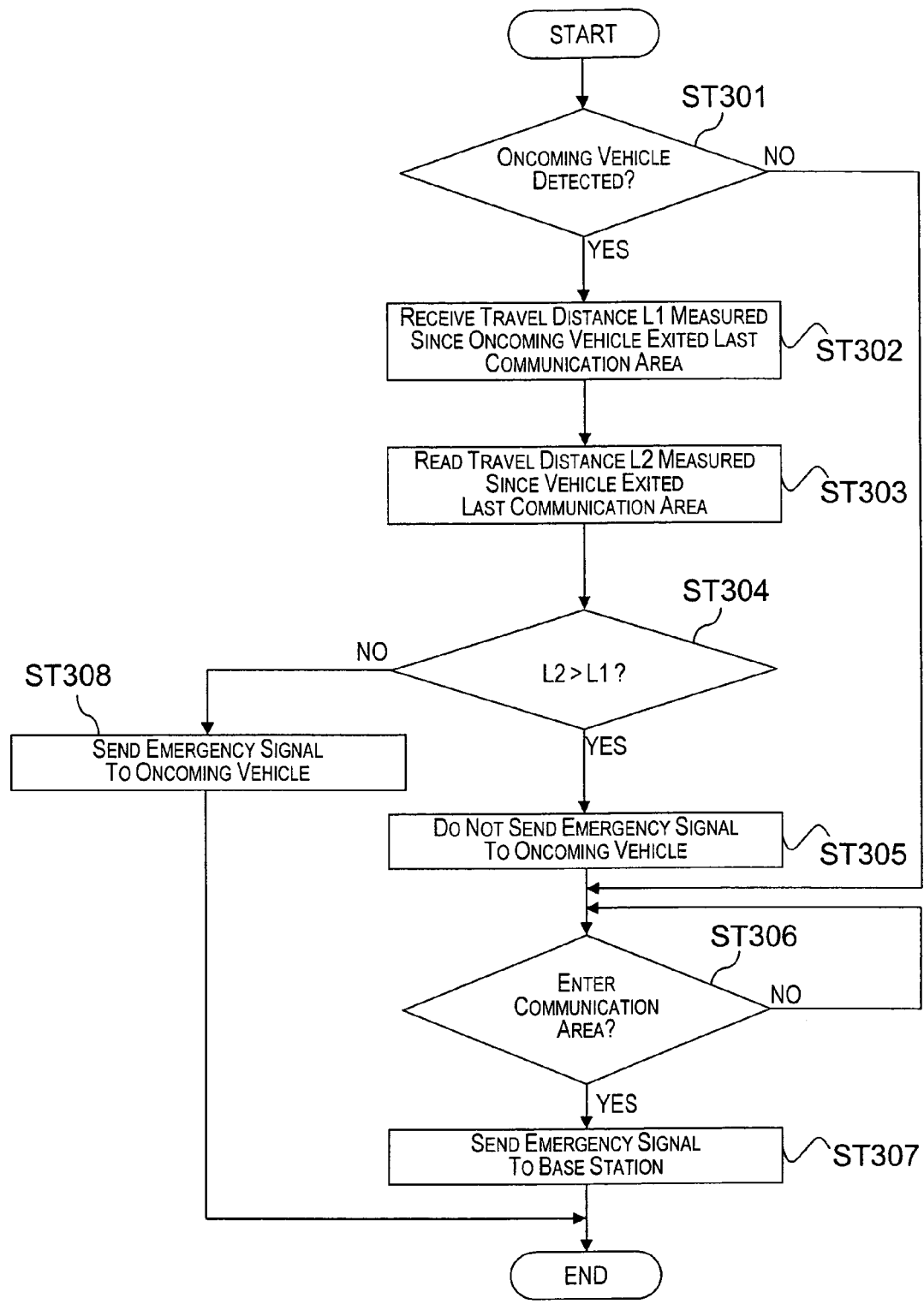
FIG. 9 is a flow chart showing an operation of the emergency reporting device in accordance with the third embodiment of the present invention.

Referring to FIG. 9, the operation processing of the emergency reporting device 3 in accordance with the first will be described. Prior to the processing shown in a flow chart in FIG. 9 starts, the vehicle 100 exits from a communication area of a base station. When the vehicle exits the communication area, the travel distance recording section 32 starts measuring the travel distance L2. Then, the vehicle 100 passes close to the emergency vehicle 120. At this time, the vehicle communication device 12 is configured and arranged to receive an emergency signal from the emergency vehicle 120 and store the received emergency signal in the emergency signal detection section 18. Then, the processing that follows the flow chart shown in FIG. 9 is executed.

Since the processing in steps ST301 and ST305~ST308 shown in FIG. 9 are identical to the processing in steps ST101, ST105~ST108 in the first embodiment shown in FIG. 2, the descriptions of the processing in these steps will be omitted. Moreover, in the third embodiment of the present invention, when the determination result in step ST301 is "NO", the processing proceeds to step ST306 as shown in FIG. 9.

After the oncoming vehicle 110 is detected in step ST301, the vehicle communication device 12 installed on the vehicle 100 is configured and arranged to receive the travel information including the travel distance L1 of the oncoming vehicle 110 in step ST302. The travel distance L1 is the distance from at a point where the oncoming vehicle 110 exits the last communication area up to a point where the oncoming vehicle 110 is detected by the vehicle 100.

In step ST303, the control unit 14" is configured and arranged to read the travel distance L2 of the vehicle 100 from the travel distance recording section 32. As explained above, the measuring of the travel distance L2 in the travel distance recording section 32 has started after the vehicle 100 exiting a last communication area and ended when the vehicle 100 detects the oncoming vehicle 110. Accordingly, the travel distance L2 is a travel distance for which the vehicle 100 has been traveling outside a communication area of a base station.

In step ST304, the distance comparison section 34 is configured and arranged to compare the travel distance L1 of the oncoming vehicle 110 with the travel distance L2 of the vehicle 100 to determine whether the travel distance L2 of the vehicle 100 is longer than the travel distance L1 of the oncoming vehicle 110. Thereafter, the processing to determine whether or not to send an emergency signal based on the travel distance is executed in steps ST305~ST308 in the similar manner to the first embodiment.

Figure 10:
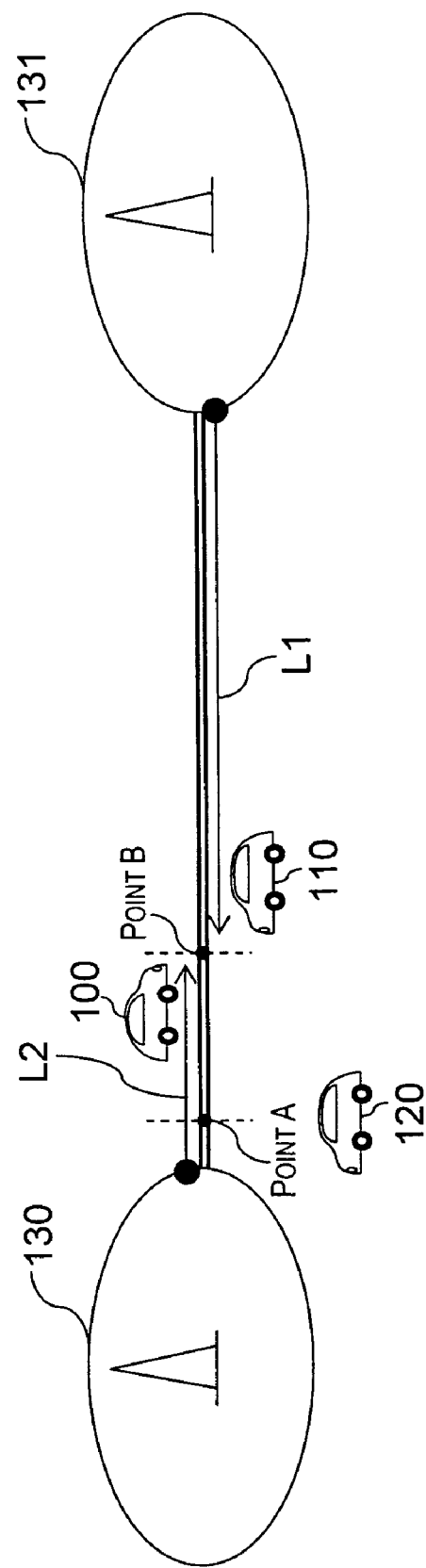
FIG. 10 is a schematic view showing the positional relationship of the vehicle and the oncoming vehicle when the emergency reporting device in accordance with the third embodiment of the present invention determines whether or not to send the emergency signal from the vehicle to the oncoming vehicle.

Next, the positional relationship between the vehicle 100 and the oncoming vehicle 110 will be explained referring to FIG. 10. FIG. 10 is a schematic view showing the positional relationship between the vehicle 100 and the oncoming vehicle 110 when the emergency reporting device 3 in accordance with the third embodiment determines whether or not to send the emergency signal. In FIG. 10, the non-communication area exists between the first communication area 130 and the second communication area 131. The vehicle 100 and the oncoming vehicle 110 are travelling toward each other on the road that is in the non-communication area.

At first, the electric field intensity detection section 20 is configured and arranged to determine whether the vehicle 100 exited from the first communication area 130. When it is detected that the vehicle 100 exited the first communication area 130, the travel distance recording section 32 is configured and arranged to start recording the travel distance L2 of the vehicle 100 that indicates the distance that the vehicle 100 has been traveling outside the first communication area 130. Also, the emergency reporting device 3 is installed in the oncoming vehicle 110 in like manner to the vehicle 100. Thus, the travel distance recording section 32 of the emergency reporting device 3 installed in the oncoming vehicle 110 is configured and arranged to start recording the travel distance L1 when the oncoming vehicle 110 exits the second communication area 131.

Thereafter, the emergency signal detection section 18 of the vehicle 100 is configured and arranged to receive an emergency signal from the emergency vehicle 120 when the vehicle 100 passes by the emergency vehicle 120 at Point A in FIG. 10. The emergency signal is stored in the emergency signal detection section 18 of the emergency reporting device 3 of the vehicle 100. Then, the vehicle 100 and the oncoming vehicle 110 pass each other at Point B in FIG. 10 on the road.

At this time, the vehicle communication device 12 of the vehicle 100 is configured and arranged to send the travel information including the travel distance L2 of the vehicle 100 measured after exiting the first communication area 130. Moreover, the vehicle communication device 12 of the vehicle 100 is configured and arranged to receive the travel information including the travel distance L1 of the oncoming vehicle 110 measured after the oncoming vehicle 110 exiting the second communication area 131.

Then, the distance comparison section 34 is configured and arranged to compare the travel distance L2 of the vehicle 100 outside the first communication area 130 with the travel distance L1 of the oncoming vehicle 110 outside the second communication area 131. When the travel distance L2 of the vehicle 100 is shorter than the travel distance L1 of the oncoming vehicle 110, the transmission determination section 26" of the vehicle 100 is configured and arranged to determine that the oncoming vehicle 110 will enter a communication area of a base station, i.e., the first communication area 130, sooner than the vehicle 100 enters into a communication area of a base station, i.e., the second communication area 131. In other words, the transmission determination section 26" is configured and arranged to determine that the oncoming vehicle 110 is more likely to enter into the first communication area 130 before the vehicle 100 enters into the second communication area 131 because the vehicle 100 has travelled for shorter distance since the vehicle 100 exited the first communication area 130 than the oncoming vehicle 110 has travelled since the oncoming vehicle 110 exited the second communication area 131.

In particular, as shown in FIG. 10, when the vehicle 100 and the oncoming vehicle 110 are travelling on the same road towards each other, the travel distance L2 of the vehicle 100 can be considered as the distance required for the oncoming vehicle 110 to travel before reaching the first communication area 130. Similarly, the travel distance L1 of the oncoming vehicle 110 can be considered as the distance required for the vehicle 100 to travel before reaching the second communication area 131.

Therefore, when the travel distance L2 of the vehicle 100 is shorter than the travel distance L1 of the oncoming vehicle 110, the vehicle communication device 12 is configured and arranged to send the emergency signal to the oncoming vehicle 110 based on the determination result of the transmission determination section 26".

In contrast, when the travel distance L2 of the vehicle 100 is longer than the travel distance L1 of the oncoming vehicle 110, the transmission determination section 26" is configured and arranged to determine that the vehicle 100 is more likely to enter a communication area of a base station, i.e., the second communication area 131, before the oncoming vehicle 10 enters a communication area of a base station, i.e., the first communication area 130. Thus, the vehicle communication device 12 is configured and arranged not to send the emergency signal to the oncoming vehicle 110 so that the emergency signal remains stored in the emergency signal detection section 18 of the vehicle 100.

Figure 11:
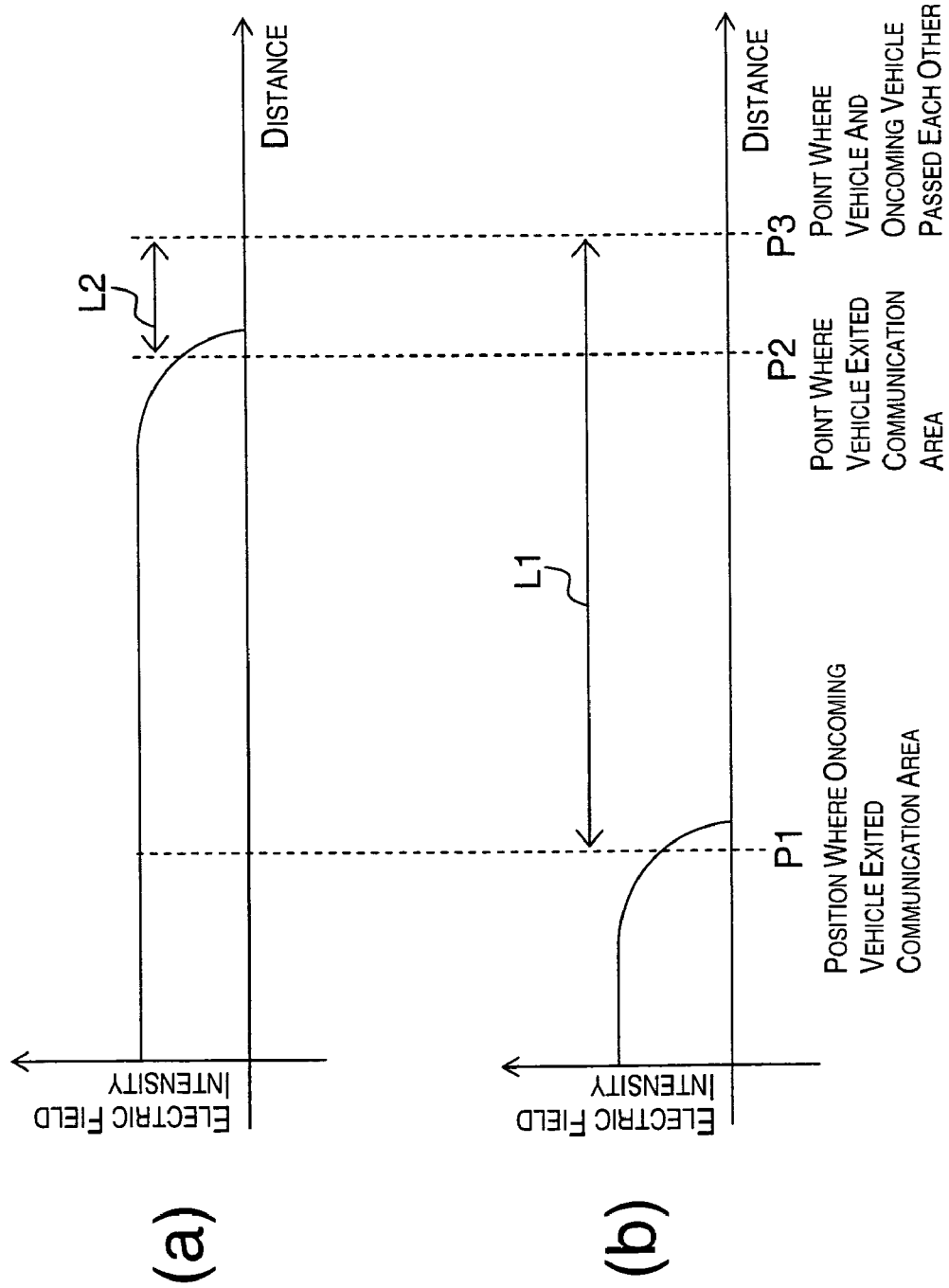
FIG. 11 is a chart showing changes in the detected electric field intensity of the vehicle (shown in graph (a)) and the oncoming vehicle (shown in graph (b)) in accordance with the third embodiment of the present invention.

Next, referring to FIG. 11, the relationship between the electric field intensities of the communication areas 130 and 131 detected by the electric field intensity detection sections 20 of the vehicles 100 and 110 and starting and ending the measuring of the travel distance L1 or L2 by the travel time recording sections 22 will be described. The graph (a) of FIG. 11 is a chart showing changes in a detected electric field intensity of the first communication area 130 by the vehicle 100, while the graph (b) of FIG. 11 is a chart showing changes in a detected electric field intensity of the second communication area 131 by the oncoming vehicle 110. In FIG. 11, the ordinate of each graph is the electric field intensity and the abscissa of each graph is the distance. The distance axes of graphs (a) and (b) in FIG. 11 coincide.

In FIG. 11, a point P1 is a position where the oncoming vehicle 110 exited the communication area. At the point P1, the electric field intensity detected by the electric field intensity detection section 20 of the oncoming vehicle 110 (shown in graph (b)) is equal to or less than the prescribed value. Thus, at this time, the electric field intensity detection section 20 of the oncoming vehicle 110 is configured and arranged to determine that communication between the base station of the communication area 131 and the base station communication device 10 of the oncoming vehicle 110 is not possible. Upon the determination of the electric field intensity detection section 20 that the communication between the base station of the communication area 131 and the base station communication section 10 is not possible, the travel distance recording section 32 of the oncoming vehicle 110 is configured and arranged to start measuring of the travel distance L1.

Also, a point P2 is a position where the vehicle 100 exited the communication area. At the point P2, the electric field intensity detected by the electric field intensity detection section 20 of the vehicle 100 (shown in graph (a)) is equal to or less than the prescribed value. At this time, the electric field intensity detection section 20 of the vehicle 100 is configured and arranged to determine that communication between the base station of the communication area 130 and the base station communication device 10 of the vehicle 100 is not possible. Upon this determination of the electric field intensity detection section 20, the travel distance recording section 32 of the vehicle 100 is configured and arranged to start measuring of the travel distance L2. The emergency reporting device 3 of the vehicle 100 receives the emergency signal from the emergency vehicle 120 after the point P2 and before a point P3 in FIG. 11.

Then, at the point P3 in FIG. 4, the vehicle 100 and the oncoming vehicle 110 pass each other, and the peripheral vehicle detecting section 16 of the vehicle 100 is configured and arranged to detect the oncoming vehicle 110. Upon the detection of the oncoming vehicle 110, the travel distance recording sections 32 installed in both the vehicles 100 and 110 end the measuring of travel distances L2 and L1, respectively. The vehicle 100 and the oncoming vehicle 110 then communicate the travel information including the travel distances L2 or L1 through the vehicle communicating devices 12 installed in the vehicle 100 and the oncoming vehicle 110. Since the vehicle 100 and the oncoming vehicle 110 pass each other in the non-communication area, the electric field intensities detected in both the vehicle 100 and the oncoming vehicle 110 are equal to or less than the prescribed value at the point P3.

Accordingly, the travel distance L2 after the vehicle 100 exited the first communication area 130 is a distance measured from the point P2 to the point P3 in FIG. 11. When the vehicle 100 and the oncoming vehicle 110 are travelling towards each other on the road as seen in FIG. 10, the travel distance L2 is the distance required for the oncoming vehicle 110 to travel before reaching the first communication area 130 after the oncoming vehicle 110 passes the vehicle 100.

Also, the travel distance L1 after the oncoming vehicle 110 exited the second communication area 132 is a distance measured from point P1 to the point P3 in FIG. 11. When the vehicle 100 and the oncoming vehicle 110 are travelling toward each other on the road as shown in FIG. 10, the travel distance L1 is the distance required for the vehicle 100 to travel before reaching the second communication area 131 after the vehicle 100 passes the oncoming vehicle 110.

Accordingly, the emergency reporting device 3 in accordance with the third embodiment makes it possible to reduce the load on the communication lines of the base stations when sending emergency signals.

Moreover, in the third embodiment of the present invention, the transmission determination section 26" is configured and arranged to use the travel distances L1 and L2 of the vehicle 100 and the peripheral vehicle (the oncoming vehicle 110) to estimate the distances required for the vehicle 100 and the oncoming vehicle 110 to travel before entering a communication area. Then the transmission determination section 26" is configured and arranged compare the travel distance of the vehicle 100 and the travel distance of the oncoming vehicle 110 to determine whether or not to send the emergency signal. One of the vehicle 100 and the oncoming vehicle 110 that has a longer travel distance is assumed to require a shorter travel distance before entering a communication area again. In contrast, the other one of the vehicle 100 and the oncoming vehicle 110 that has a shorter travel distance is assumed to require a longer travel distance before entering a communication area again. In particular, when the vehicle 100 and the oncoming vehicle 110 are travelling on the same road towards each other, the travel distance L2 of the vehicle 100 can be considered as a travel distance required for the oncoming vehicle 110 to travel before entering into the communication area. Likewise, the travel distance L1 of the oncoming vehicle 110 can be considered as a travel distance required for the vehicle 100 to travel before entering into the communication area. Consequently, it is possible to determine whether the vehicle 100 or the oncoming vehicle 110 is more likely to enter into a communication area first with even more reliability based on the travel distance.

In the third embodiment of the present invention, the emergency reporting device 3 can be configured and arranged to determine whether or not to send signals based on the traffic information including the road closure information of areas where road closures are occurring and the traffic jam information of areas where traffic jams are occurring in addition to the travel distances as in the emergency reporting device 2 of the second embodiment.

Fourth Embodiment

Figure 12:
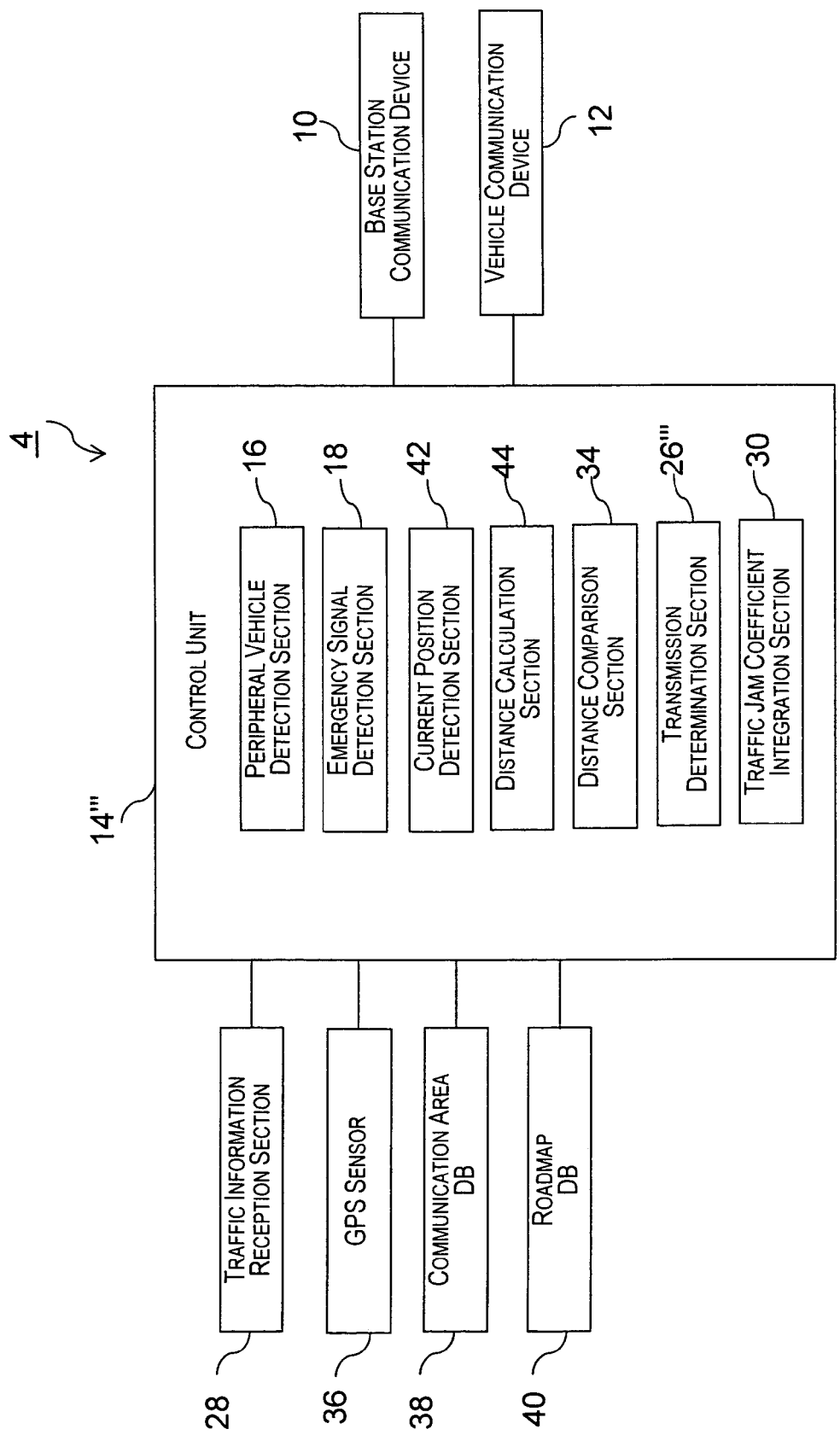
FIG. 12 is a block diagram showing a configuration of the emergency reporting device in accordance with a fourth embodiment of the present invention.
Figure 13:
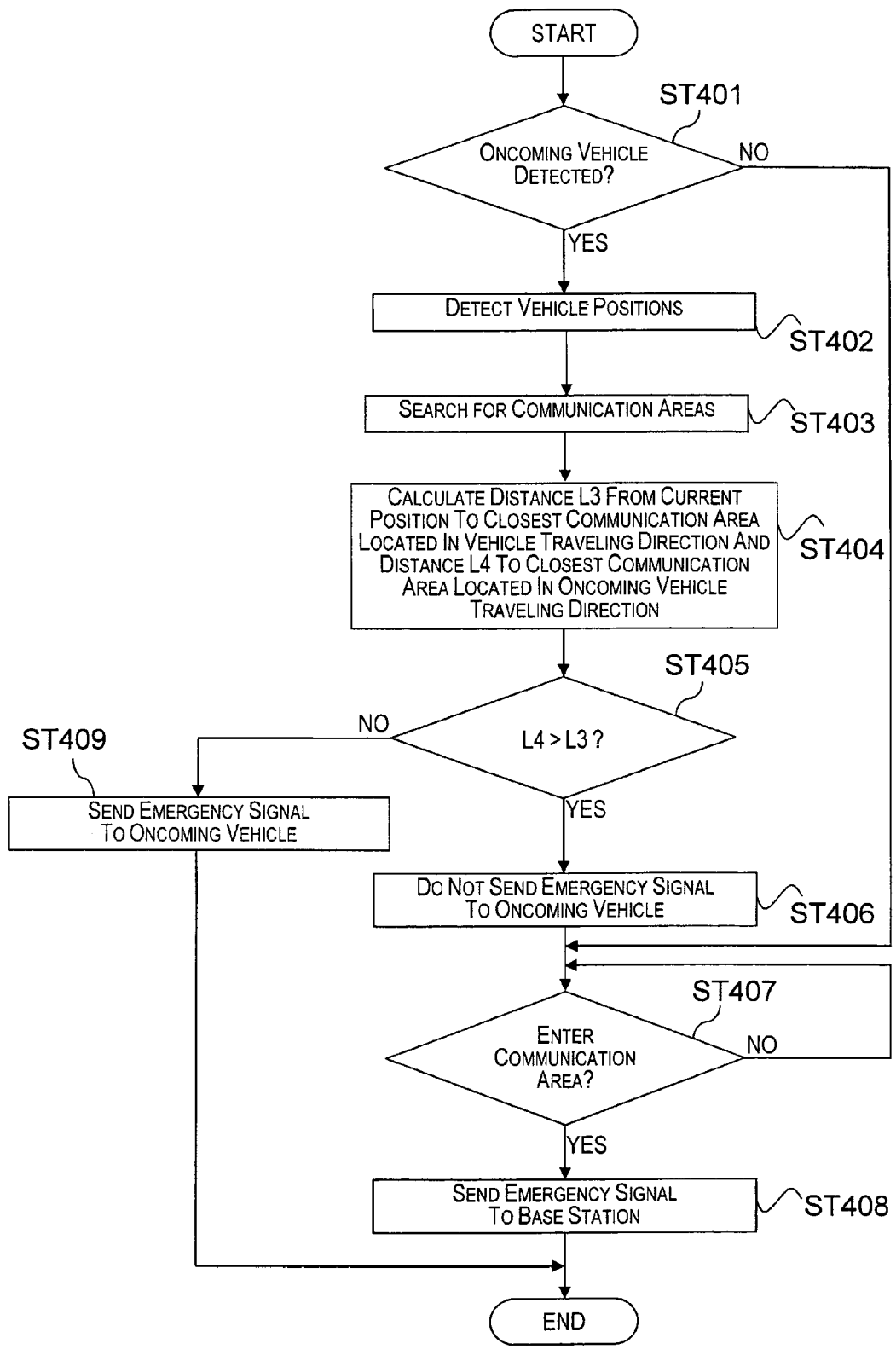
FIG. 13 is a flow chart showing an operation of the emergency reporting device in accordance with the fourth embodiment of the present invention.
Figure 14:
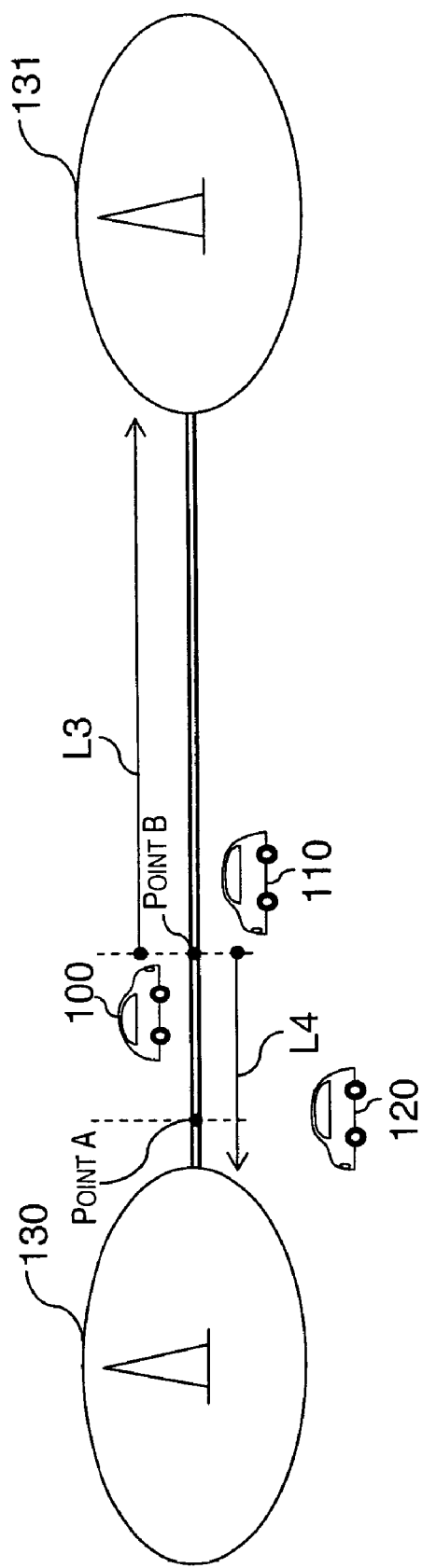
FIG. 14 is a schematic view showing the positional relationship of the vehicle and the oncoming vehicle when the emergency reporting device in accordance with the fourth embodiment of the present invention determines whether or not to send an emergency signal from the vehicle to the oncoming vehicle.

Referring now to FIGS. 12–14, an emergency reporting device 4 in accordance with a fourth embodiment will now be explained. In view of the similarity between the first, third and fourth embodiments, the parts of the fourth embodiment that are identical to the parts of the first and third embodiments will be given the same reference numerals as the parts of the first embodiment. Moreover, the descriptions of the parts of the fourth embodiment that are identical to the parts of the first or third embodiment may be omitted for the sake of brevity. The parts of the fourth embodiment that differ from the parts of the first or third embodiment will be indicated with a triple prime ("').

FIG. 12 is a block diagram showing a configuration of the emergency reporting device 4 in accordance with the fourth embodiment of the present invention. As shown in FIG. 4, the emergency reporting device 4 of the fourth embodiment is identical to the emergency reporting device 3 of the third embodiment, except for the control unit 14"' is coupled to a GPS sensor 36, a communication area information storage section or a communication area database (DB) 38, and a roadmap storage section or a roadmap database (DB) 40 and the control unit 14"' includes a current position detection section 42 and a distance calculation section 44 instead of the travel distance recording section 32 and the distance comparison section 34. In the emergency reporting device 4 of the fourth embodiment, a distance L3 between a current position of the vehicle 100 and a closest communication area in the travel direction of the vehicle 100 and a distance L4 between an estimated current position of the oncoming (peripheral) vehicle 110 and a closest communication area in the travel direction of the peripheral vehicle are calculated based on the current position of the vehicle 100 obtained by the GPS sensor 36 and information on communication areas stored in the communication area DB 38. Then, the distance L3 is compared with the distance L4 to determine which of the vehicle 100 and the peripheral vehicle is more likely to enter into a communication area first. In the fourth embodiment of the present invention, the oncoming vehicle 110 will be used as an example of the peripheral vehicle as well. Of course, it will be apparent to those skilled in the art from this disclosure that the peripheral vehicle is not limited to an oncoming vehicle. The peripheral vehicle can be any vehicle that is on the periphery of the vehicle 100.

The GPS sensor 36 is configured and arranged to receive radio waves from multiple GPS satellites. The communication area DB 38 is configured and arranged to store information on the communication areas of base stations, including but not limited, to positions of the communication areas and the base stations. The roadmap DB 40 is configured and arranged to store roadmap information. The current position detection section 42 is configured and arranged to detect a current position of the vehicle 100 in conjunction with the roadmap information when the peripheral vehicle detection section 16 detects the oncoming vehicle 100.

The distance calculation section 44 is configured and arranged to calculate a distance between a current position of the vehicle 100 and a communication area of a base station located in the travel direction of the vehicle 100 based on the current position of the vehicle 100 detected by the current position detection section 42 and the information on the communication areas of base stations stored in the communication area DB 38. The distance calculation section 44 is further configured and arranged to estimate a current position of the oncoming vehicle 110 that is with the peripheral area of the vehicle 100 as the current position of the vehicle 100. Then the distance calculation section 44 is configured and arranged to calculate a distance between the current position of the oncoming vehicle 110 and a communication area located in the travel direction of the oncoming vehicle 110 based on the estimated current position of the oncoming vehicle 110 and the information on the communication areas of the base stations stored in the communication area DB 38.

Referring now to FIG. 13, the operation processing of the emergency reporting device 4 in accordance with the fourth embodiment will be described. FIG. 13 is a flow chart showing the operation processing of the emergency reporting device 4. Prior to the processing shown in the flow chart in FIG. 13 starts, the vehicle 100 exits from a communication area 130 of a base station. Then, the vehicle 100 passes close to the emergency vehicle 120. At this time, the vehicle communication device 12 is configured and arranged to receive an emergency signal from the emergency vehicle 120 and store the received emergency signal in the emergency signal detection section 18. Then, the processing that follows the flow chart shown in FIG. 13 is executed.

Since the processing in steps ST401, ST407 and ST408 shown in FIG. 13 are identical to the processing in steps ST101, ST106 and ST107 in the first embodiment shown in FIG. 2, the descriptions of the processing in these steps will be omitted. Moreover, in the emergency reporting device 4 of the fourth embodiment, when the determination result in step ST401 is "NO", the processing proceeds to ST407.

After the oncoming vehicle 110 is detected in step ST401, the current position detection section 42 installed in the vehicle 100 is configured and arranged to detect the current position of the vehicle 100 based on radio waves received by the GPS sensor 36 in step ST402. Then, in step ST403, the control unit 14''' is configured and arranged to search for the communication areas of the base stations that are in the vicinity of the current position of the vehicle 100 based on the information on the communication areas stored in the communication area DB 38 and the current position of the vehicle 100 detected by the current potion detection section 42. Preferably, the control unit 14''' is configured and arranged to search for the closest one of the communication areas of the base stations from the current position of the vehicle 100 and based on the travel direction of the vehicle 100.

In step ST404, the distance calculation section 44 is configured and arranged to calculate a distance L3 between a closest communication area located in the direction of travel of the vehicle 100 and the current position of the vehicle 100. Then the distance calculation section 44 is configured and arranged to estimate a current position of the oncoming vehicle 110 based on the current position of the vehicle 100. In accordance with the estimated current position of the oncoming vehicle 110, the distance calculation section 44 is configured and arranged to calculate a distance L4 between the estimated current position of the oncoming vehicle 110 and a closest communication area located in the direction of travel of the oncoming vehicle 110 in step ST404.

Although not shown in the flow chart of FIG. 13, the distances L3 and L4 can be adjusted based on traffic information using steps ST205, ST206 and ST211 to ST 214, where the time estimates T1 and T2 are replaced with distances L3 and L4.

After the distances L3 and L4 are calculated in step ST404, the distance comparison section 34 is configured and arranged to determine whether or not the distance L3 is shorter than the distance L4 in step ST405. As described above, the distance L3 indicates the distance from the current position of the vehicle 100 up to the closest communication area in the direction of travel of the vehicle 100, and the distance L4 indicates the distance from the estimated current position of the oncoming vehicle 110 up to the closest communication area in the direction of travel of the oncoming vehicle 110.

When the determination result in step ST405 is that the distance L3 is shorter than the distance L4 (step ST405 is YES), the processing proceeds to step ST406. In step ST406, the transmission determination section 26 is configured and arranged to determine that the vehicle 100 is more likely to enter into the communication area before the oncoming vehicle 110 enters into the communication area. Thus, in step ST406, the vehicle communication device 12 is configured and arranged not to send the emergency signal to the oncoming vehicle 10 so that the emergency signal remains stored in by the vehicle 100. Then, the processing completes after the processing in steps ST407 and ST408 are executed.

In contrast, when the determination result in step ST405 is that the distance L3 is not shorter than the distance L4 (step ST405 is NO), the transmission determination section 26''' is configured and arranged to determine that the oncoming vehicle 110 is more likely to enter into the communication area before the vehicle 100 enters into the communication area. Thus, in step ST409, the vehicle communication device 12 is configured and arranged to send the emergency signal to the oncoming vehicle 110. The processing then ends.

Next, the positional relationship between the vehicle 100 and the oncoming vehicle 110 will be explained referring to FIG. 14. FIG. 14 is a schematic view showing the positional relationship between the vehicle 100 and the oncoming vehicle 110 when the emergency reporting device 4 in accordance with the fourth embodiment determines whether or not to send the emergency signal. In FIG. 14, the non-communication area exists between the first communication area 130 and the second communication area 131. The vehicle 100 and the oncoming vehicle 110 are travelling toward each other on the road that is in the non-communication area.

At first, the vehicle 100 receives an emergency signal from the emergency vehicle 120 at Point A in FIG. 14. Then, the vehicle 100 and the oncoming vehicle 110 pass each other at Point B in FIG. 14 on the road. Then the peripheral vehicle detection section 16 detects the oncoming vehicle 110.

Upon the detection of the oncoming vehicle 110, the current position detection section 42 detects the current position of the vehicle 100 based on radio waves received by the GPS sensor 36. Also, the distance calculation section 44 then calculates the distance L3 from the current position of the vehicle 100 up to a closest communication area located in the travel direction of the vehicle 100, i.e., the second communication area 131, based on the current position of the vehicle 100 and the information in the communication areas stored in the communication area DB 38.

Moreover, the distance calculation section 44 estimates the current position of the oncoming vehicle 110 as the current position of the vehicle 100. Then the distance calculation section 44 calculates the distance L4 from the estimated current position of the oncoming vehicle 10 up to a closest communication area located in the travel direction of the oncoming vehicle 110, i.e., the first communication area 130, based on this estimated position and the communication areas stored in the communication area DB 38. Thereafter, the distance comparison section 34 compares the distances L3 and LA.

When the distance L3 between the vehicle 100 and the second communication area 131 is not shorter than the distance LA between the oncoming vehicle 110 and the first communication area 130, the transmission determination section 26 determines that the oncoming vehicle 110 is more likely to enter into the first communication area 130 before the vehicle 100 enters into the second communication area. Thus, the vehicle communication device 12 sends the emergency signal to the oncoming vehicle 110.

Thereafter, when the oncoming vehicle 110 enters into the first communication area 130, the base station communication device 10 installed on the oncoming vehicle 110 transmits the emergency signal to the base station. Accordingly, the emergency signal issued by the emergency vehicle 120 is relayed to the base station.

When the distance L3 between the vehicle 100 and the second communication area 131 is shorter than the distance L4 between the oncoming vehicle 110 and the first communication area 130, the transmission determination section 26 is configured and arranged to determine that the vehicle 100 is more likely to enter into the second communication area 131 before the oncoming vehicle 110 enters into the first communication area 130. Thus, the vehicle communication device 12 is configured and arranged not to send the emergency signal to the oncoming vehicle 110 so that the emergency signal remains held in the vehicle 100.

Thereafter, when the vehicle 100 enters into the second communication area 131, the base station communication device 10 of the vehicle 100 is configured and arranged to transmit the emergency signal to the base station. Accordingly, the emergency signal issued by the emergency vehicle 120 is relayed to the base station.

Accordingly, the emergency reporting device 4 in accordance with the fourth embodiment determines whether or not to send an emergency signal based on the distances L3 and L4 up to communication areas from the current positions of the vehicle 100 and the peripheral vehicle (the oncoming vehicle 110). These distances L3 and L4 are calculated based on the current position of the vehicle 100 obtained by the GPS sensor 36 and the information on the communication areas stored in the communication area DB 38. In other words, the emergency reporting device 4 is configured and arranged to estimate which of the vehicle 100 and the peripheral vehicle is more likely to enter into a communication area first and then determines whether or not to send an emergency signal by comparing the distances L3 and L4. Consequently, the emergency signals is not sent out randomly but is held in one of the vehicle 100 and the peripheral vehicle that is presumed to enter into a communication area of the base station first. Then, when the one of the vehicle 100 and the peripheral vehicle holding the emergency signal enters the communication area, the emergency signal is relayed to the base station. This arrangement of the emergency reporting device 4 eliminates the need to send the emergency signal to many vehicles in order to quickly convey the emergency signal to the base stations. Therefore, the load on the communication lines of the base station when sending the emergency signal can be reduced.

Furthermore, the emergency reporting device 4 in accordance with the fourth embodiment is preferably configured and arranged to receive the traffic information. Thus, the traffic information reception section 28 and the traffic jam coefficient integration section 30 are preferably installed in the emergency reporting device 4 such that the emergency reporting device 4 can be configured and arranged to determine whether or not to send emergency signals based on the traffic information. In such a case, it is possible to determine whether or not to send an emergency signal with even more accuracy.

Fifth Embodiment

Figure 15:
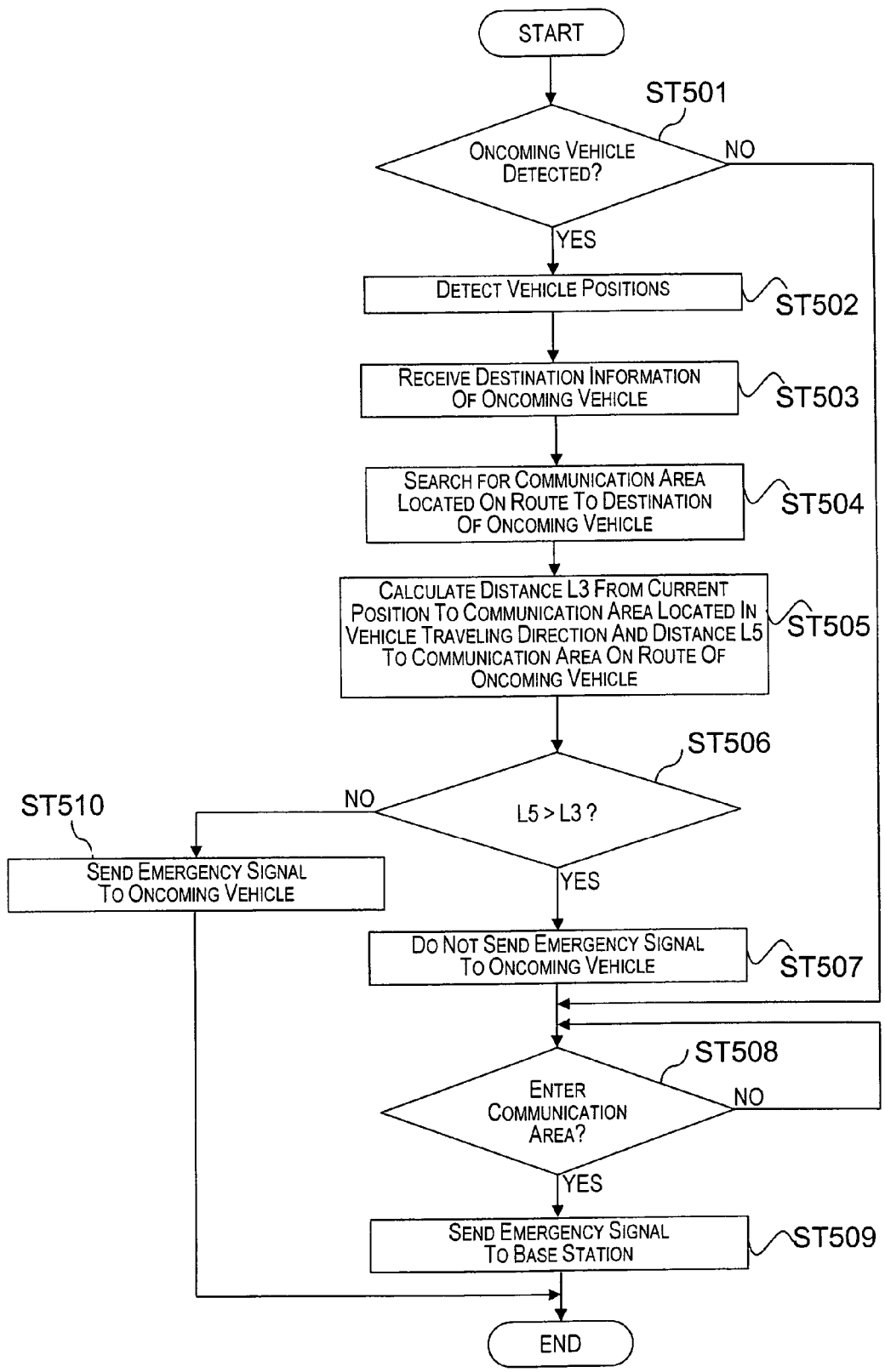
FIG. 15 is a flow chart showing an operation of an emergency reporting device in accordance with a fifth embodiment of the present invention.

Referring now to FIGS. 12 and 15, the fifth embodiment of the present invention will be explained. Basically, the components and structures of the emergency reporting device 4 of the fourth embodiment as shown in FIG. 12 can be utilized to carry out the fifth embodiment of the present invention. In view of the similarity between the fourth and fifth embodiments, the descriptions of the parts of the fifth embodiment that are identical to the parts of the fourth embodiment may be omitted for the sake of brevity.

In the fifth embodiment of the present invention, the vehicle communication device 12 of the emergency reporting device 4 is configured and arranged to receive destination information including a destination of the peripheral vehicle. Moreover, the control unit 14''' of the emergency reporting device 4 is configured and arranged to search for communication areas located on a travel road up to the destination of peripheral vehicle based on the roadmap information stored in the roadmap DB 40.

Referring now to FIG. 15, the operation processing of the fifth embodiment will be described. FIG. 15 is a flow chart showing the operation processing of the emergency reporting device 4 in accordance with the fifth embodiment of the present invention. Prior to the processing shown in the flow chart in FIG. 15 starts, the vehicle 100 exits from a communication area of a base station. Then, the vehicle 100 passes close to the emergency vehicle 120. At this time, the vehicle communication device 12 is configured and arranged to receive an emergency signal from the emergency vehicle 120 and store the received emergency signal in the emergency signal detection section 18. Then, the processing that follows the flow chart shown in FIG. 15 is executed.

Since the processing in step ST501, ST502, ST508 and ST509 shown in FIG. 15 are identical to the processing in step ST401, ST402, ST407 and ST408 in the fourth embodiment shown in FIG. 13, the descriptions of the processing in these steps will be omitted. Moreover, in the fifth embodiment, when the determination result in step ST501 is "NO", the processing proceeds to ST508. In the description below, the oncoming vehicle 110 will be described as a peripheral vehicle in the example as well. Of course, it will be apparent to those skilled in the art from this disclosure that the peripheral vehicle is not limited to an oncoming vehicle. The peripheral vehicle can be any vehicle that is in a peripheral area of the vehicle 100.

After the current position of the vehicles 100 and 110 are detected in step ST502, the vehicle communication device 12 is configured and arranged to receive the destination information including the destination of the oncoming vehicle 110 in step ST503. In step ST 504, the control unit 14''' is configured and arranged to search for communication areas located on the travel road up to the destination of the oncoming vehicle 110 based on the roadmap information stored in the roadmap DB 40 and the destination information received from the oncoming vehicle 110. Then, in step ST505, the distance calculation section 44 is configured and arranged to calculate the distance L3 between the current position of the vehicle 100 and the closest communication area located in the travel direction of the vehicle 100 or located on the travel route up to the destination of the vehicle 100. Also in step ST505, the distance calculation section 44 is further configured and arranged to calculate the distance L5 between the estimated position of the oncoming vehicle 110 and the closest communication area located on the travel route up to the destination of the oncoming vehicle 110.

Although not shown in the flow chart of FIG. 15, the distances L3 and L5 can be adjusted based on traffic information using steps ST205, ST206 and ST211 to ST 214, where the time estimates T1 and T2 are replaced with distances L3 and L5.

After the distances L3 and L5 are calculated in step ST505, the distance comparison section 34 is configured and arranged to determine whether or not the distance L3 is shorter than the distance L5 in step ST506. As described above, the distance L3 indicates the distance from the current position of the vehicle 100 up to the closest communication area in the direction of travel or along the route of the vehicle 100, and the distance L5 indicates the distance from the estimated current position of the oncoming vehicle 110 up to the closest communication area on the travel route up to the destination of the oncoming vehicle 110.

When the determination result in step ST506 is that the distance L3 is shorter than the distance L5 (step ST506 is YES), the processing proceeds to step ST507. In step ST507, the transmission determination section 26''' is configured and arranged to determine that the vehicle 100 is more likely to enter into the communication area before the oncoming vehicle 110 enters into the communication area. Thus, in step ST507, the vehicle communication device 12 is configured and arranged not to send the emergency signal to the oncoming vehicle 110 so that the emergency signal remains held by the vehicle 100. Then, the processing completes after the processing in steps ST508 and ST509 are executed. In contrast, when the determination result in step ST506 is that the distance L3 is not shorter than the distance L5 (step ST506 is NO), the transmission determination section 26''' is configured and arranged to determine that the oncoming vehicle 110 is more likely to enter into the communication area before the vehicle 100 enters into the communication area. Thus, in step ST510, the vehicle communication device 12 is configured and arranged to send the emergency signal to the oncoming vehicle 110. The processing then ends.

Accordingly, the fifth embodiment of the present invention makes it possible to reduce the load on the communication lines of the base station when sending an emergency signal in the similar manner to the fourth embodiment.

Also, in the fifth embodiment of the present invention, the distance L5 between the closest communication area and the peripheral vehicle (the oncoming vehicle 110) is calculated taking into consideration the destination of the peripheral vehicle, the travel route of the peripheral vehicle after the oncoming vehicle 110 passed by the vehicle 100 is taken into consideration. Then, the transmission determination section 26''' determines whether or not to send the emergency signal by comparing the distances L3 and L5. Accordingly, for example, when the oncoming vehicle 110 is traveling on a lane that branches into a multiple roads and some of the roads do not have any communication areas on them, it is still possible to reliably determine whether or not to send the emergency signal. Consequently, it is possible to reliably determine which of the vehicle 100 and the peripheral vehicle is more likely to enter into a communication area first.

Moreover, although the distance L5 between the estimated position of the oncoming vehicle 110 and the communication area located on the travel route up to the destination of the peripheral vehicle is calculated only taking into consideration the destination information of the peripheral vehicle in the fifth embodiment, a distance L6 between the current position of the vehicle 100 and the closest communication area in the travel direction on the travel route up to a destination of the vehicle 100 can also be calculated taking into consideration the destination information of the vehicle 100. Then, the distance L6 is compared with the distance L5 to determine which of the vehicle 100 and the oncoming vehicle 110 is more likely to enter into the communication area first.

Furthermore, the emergency reporting device 4 in accordance with the fifth embodiment is preferably configured and arranged to receive the traffic information. Thus, the traffic information reception section 28 and the traffic jam coefficient integration section 30 are preferably installed in the emergency reporting device 4 such that the emergency reporting device 4 can be configured and arranged to determine whether or not to send emergency signals based on the traffic information. In such a case, it is possible to determine whether or not to send an emergency signal with even more accuracy.

Sixth Embodiment

Figure 16:
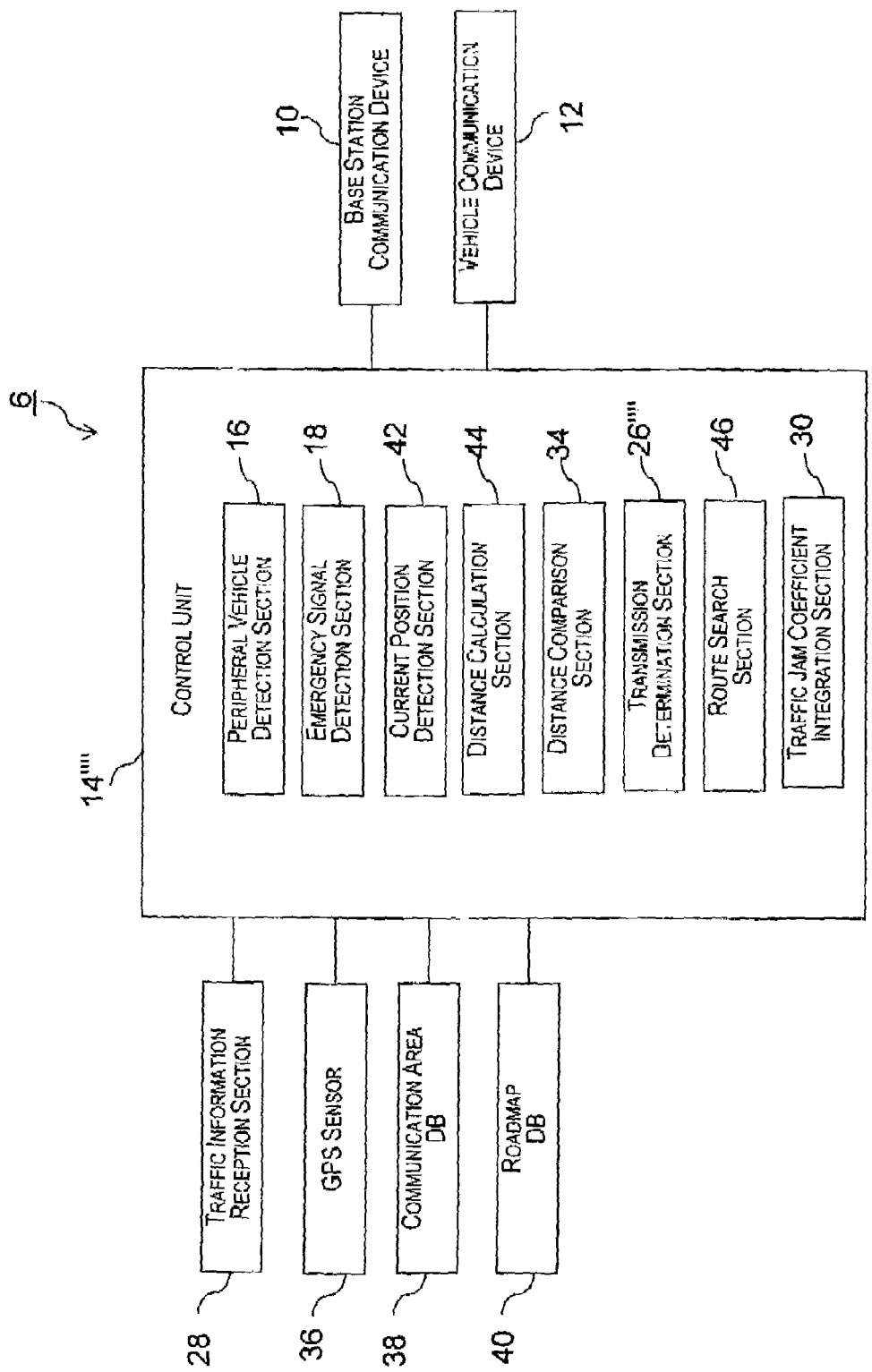
FIG. 16 is a block diagram showing a configuration of an emergency reporting device in accordance with a sixth embodiment of the present invention.
Figure 17:
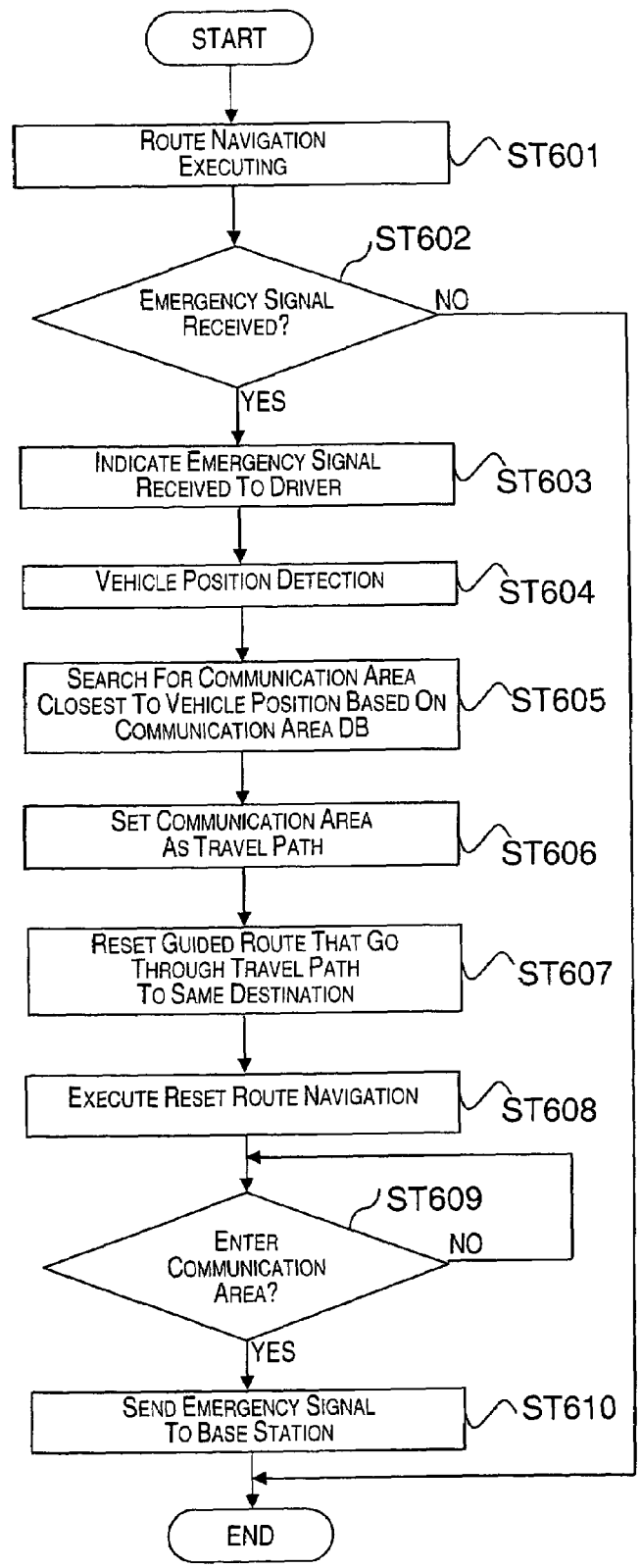
FIG. 17 is a flow chart showing an operation of the emergency reporting device in accordance with the sixth embodiment of the present invention.

Referring now to FIGS. 16–18, an emergency reporting device 6 in accordance with a sixth embodiment will now be explained. In view of the similarity between the first, fourth and sixth embodiments, the parts of the sixth embodiment that are identical to the parts of the first or fourth embodiment will be given the same reference numerals as the parts of the first or fourth embodiment. Moreover, the descriptions of the parts of the sixth embodiment that are identical to the parts of the first or fourth embodiment may be omitted for the sake of brevity. The parts of the sixth embodiment that differ from the parts of the first or fourth embodiment will be indicated with a fourfold prime ('''').

FIG. 16 is a block diagram showing a configuration of the emergency reporting device 6 in accordance with the sixth embodiment of the present invention. As shown in FIG. 6, the emergency reporting device 6 of the sixth embodiment is identical to emergency reporting device 4 of the fourth embodiment, except for a route search section 46 is included in the control unit 14'''' in addition to the composition of the emergency reporting device 4 of the fourth embodiment. In other words, in addition to the comparison between vehicles 100 and 110 to determine whether or not to transfer the emergency signal from the vehicle 100 to the vehicle 110, the emergency reporting device 6 also performs a guide route search if the emergency signal is not transferred to another vehicle.

The route search section 46 is configured and arranged to set an emergency guide route from the current position of the vehicle 100 up to the destination of the vehicle 100 based on roadmaps stored in the roadmap DB 40 and the current position of the vehicle 100 detected by the current position detection section 42. In the emergency reporting device 6 in accordance with the sixth embodiment of the present invention, when the vehicle 100 receives the emergency signal, a prior guide route up to the destination previously set in the vehicle 100 is reset so as to pass through a communication area of a base station, preferably the closest communication area that does not significantly diverge from the vehicle's destination. Consequently, the vehicle 100 enters into the communication area by following the reset guide route and then sends the emergency signal to the base station. The prior guide route and the emergency guide route are preferably presented to a driver of the vehicle 100 on a displaying device such as a navigation screen of a navigation system installed in the vehicle 100.

Referring now to FIG. 17, the operation processing of the sixth embodiment will be described. FIG. 17 is a flow chart showing the operation processing of the emergency reporting device 6 in accordance with the sixth embodiment of the present invention. At first, in step ST601, the route search section 46 is configured and arranged to search and set a guide route from the current position of the vehicle 100 to a destination of the vehicle 100 set by a driver. Thereafter, in step ST602, the control unit 14"" is configured and arranged to determine whether or not the emergency signal was received. When the determination result in step ST602 is that the emergency signal was not received (step ST602 is NO), the processing ends.

When the determination result in step ST602 is that the emergency signal was received (step ST602 is YES), the emergency signal detection section 18 is configured and arranged to notify the driver that the emergency signal was received utilizing the navigation screen, indicators or sounds in step ST603. Then, in step ST604 the current position detection section 42 is configured and arranged to detect the current position of the vehicle 100 based on radio waves received by the GPS sensor 36.

After detecting the current position of the vehicle 100, in step ST605, the control unit 14"" is configured and arranged to search for the communication areas of the base stations that are in the vicinity of the current position of the vehicle 100 based on the information on the communication areas stored in the communication area DB 38 and the current position of the vehicle 100 detected by the current potion detection section 42. Preferably, the control unit 14"" is configured and arranged to search for the closest one of the communication areas of the base stations from the current position of the vehicle 100.

In step ST606, the route search section 46 is configured and arranged to set at least one travel path for the vehicle which crosses through the communication area located in step ST605. Thereafter, in step ST607, the route search section 46 is configured and arranged to reset the prior guide route to an emergency guide route that passes through the travel path set in ST606 without changing the destination. After resetting the guide route, in step ST608, the guidance of the vehicle 100 is executed using the emergency guide route. The guidance of the vehicle 100 is executed, for example, by displaying the emergency guide route on the navigation screen of the navigation system installed in the vehicle 100.

In step ST609, the control unit 14"" is configured and arranged to determine whether or not the vehicle 100 has entered into the communication area of the base station based on the information on the communication areas stored in the communication area DB 38. When the determination result in step ST609 is that the vehicle 100 has not entered into the communication area of the base station (step ST609 is NO), the processing of step ST609 will repeat until the vehicle 100 enters the communication area. When the determination result in step ST609 is that the vehicle 100 entered into the communication area of the base station (step ST609 is YES), the base station communication device 10 is configured and arranged to send the emergency signal to the base station in step ST610. The processing then ends.

Figure 18B:
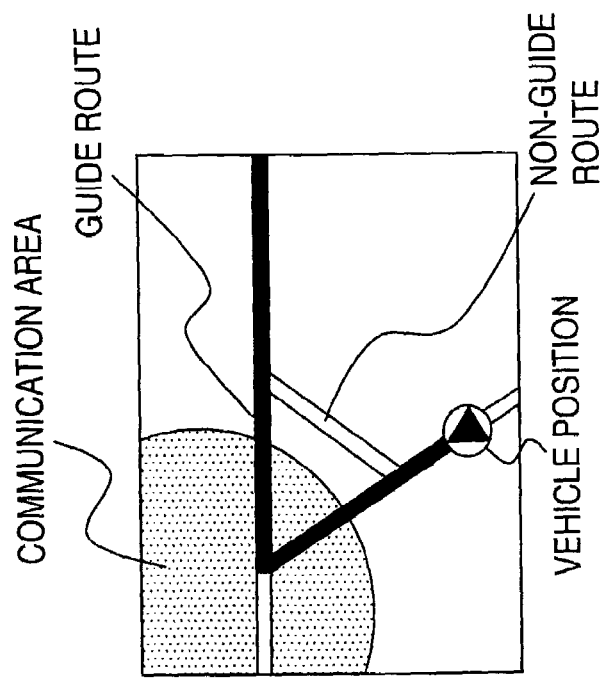
FIG. 18(b) is a schematic view showing a reset guide route after receiving the emergency signal with the emergency reporting device in accordance with the sixth embodiment of the present invention.
Figure 18A:
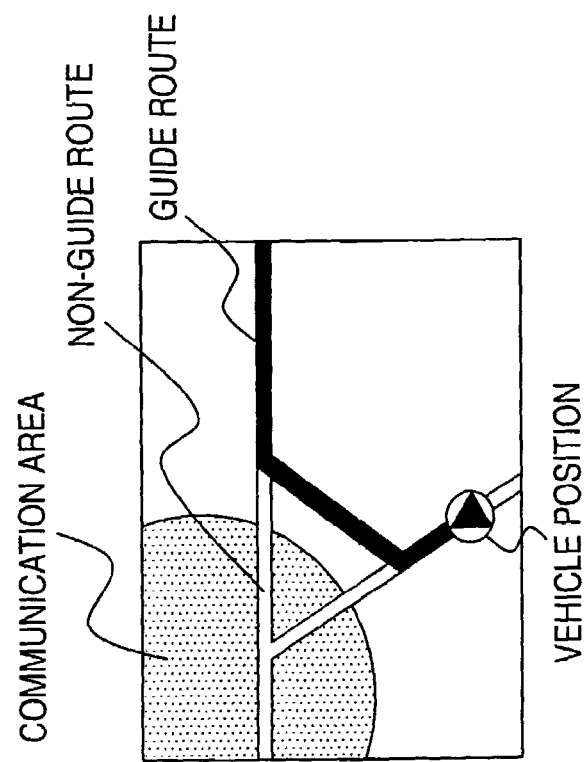
FIG. 18(a) is a schematic view showing a guide route before receiving the emergency signal with the emergency reporting device in accordance with the sixth embodiment of the present invention.

FIGS. 18(a) and 18(b) are schematic views of a navigation screen illustrating a change in a guide route before and after an emergency signal is received by the emergency reporting device 6. More specifically, FIG. 18(a) shows the guide route before receiving the emergency signal and FIG. 18(b) shows the emergency guide route after receiving the emergency signal. In FIGS. 18(a) and 18(b), the destination of the vehicle 100 is set to a position toward the right of the navigation screen that is not shown in FIGS. 18(a) and 18(b).

Before receiving the emergency signal, the guide route is set as the shortest route up to the destination of the vehicle 100 as shown in FIG. 18(a). Then, when the emergency signal is received, the guide route is reset from the shortest route to an emergency guide route that passes through a communication area of a base station as shown in FIG. 18(b). Accordingly, the vehicle 100 enters into the communication area merely by following the navigation screen and the emergency signal is quickly sent to the base station.

Accordingly, in the emergency reporting device 6 in accordance with the sixth embodiment of the present invention, when the vehicle 100 receives the emergency signal, the guide route up to the destination set in the vehicle 100 is reset so as to pass through a communication area of a base station. Consequently, the vehicle 100 enters into the communication area by following the emergency guide route and sends the emergency signal to the base station. This arrangement eliminates the need to send the emergency signal to any other vehicles, and thus, eliminates the need to send the emergency signal to many vehicles. Accordingly, the emergency reporting device 6 of the sixth embodiment makes it possible to reduce the load on the communication lines of the base station when sending the emergency signal.

Furthermore, the emergency reporting device 6 in accordance with the sixth embodiment can be configured and arranged to receive the traffic information. In such a case, the traffic information reception section 28 and the traffic jam coefficient integration section 30 are preferably installed in the emergency reporting device 6 such that the emergency reporting device 6 can be configured and arranged to reset the guide route or determine whether or not to send emergency signals based on the traffic information. In such a case, it is possible to reset the guide route or determine whether or not to send an emergency signal with even more accuracy.

The present invention is not limited to the first to sixth embodiments. Although an oncoming vehicle (the oncoming vehicle 110) is described as the examples of a peripheral vehicle in the first to sixth embodiments, it is apparent to those skilled in the art from this disclosure that a peripheral vehicle is not limited to an oncoming vehicle 110. The peripheral vehicle can be any vehicle located on the periphery the vehicle 100.

Moreover, in the present invention, when the transmission determination sections 26—26''' determine that both the vehicle 100 and the peripheral vehicle are likely to enter into communication areas substantially the same time, the emergency signal can be held in the vehicle 100 and also be sent to the peripheral vehicle in view of the objective of the present invention to transmit the emergency signal to a base station as quickly as possible.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-306336. The entire disclosure of Japanese Patent Application No. 2002-306336 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An emergency reporting device to be installed in a vehicle, comprising:
    a base station communication section configured and arranged to communicate with one of a plurality of base stations and send an emergency signal to the one of the base stations after entering a communication area of the one of the base stations with the emergency signal;
    a vehicle communication section configured and arranged to communicate with a peripheral vehicle to receive travel information of the peripheral vehicle; and
    an emergency signal control unit including
        a travel information acquisition section configured to acquire travel information of the vehicle,
        a peripheral vehicle detection section configured to detect the peripheral vehicle equipped with the emergency reporting device in a peripheral area of the vehicle, and
        a transmission determination section configured to determine whether or not to send the emergency signal to the peripheral vehicle based on a comparison of the travel information of the vehicle and the travel information of the peripheral vehicle,
    the vehicle communication section being further configured and arranged to send the emergency signal to the peripheral vehicle based on a determination result of the transmission determination section.

2. The emergency reporting device as recited in claim 1, wherein
    the travel information acquisition section is further configured to acquire vehicle data regarding the vehicle exiting a last communication area in which the vehicle last traveled and to set the vehicle data as the travel information of the vehicle, and
    the peripheral vehicle is further configured to receive peripheral vehicle data regarding the peripheral vehicle exiting a last communication area in which the peripheral vehicle last traveled and to set the peripheral vehicle data as the travel information of the peripheral vehicle.

3. The emergency reporting device as recited in claim 2, wherein
    the travel information of the vehicle is a travel time of the vehicle from when the vehicle exited the last communication area in which the vehicle last traveled until the peripheral vehicle was detected by the peripheral vehicle detection section,
    the travel information of the peripheral vehicle is a travel time of the peripheral vehicle from when the peripheral vehicle exited the last communication area in which the peripheral vehicle last traveled until the peripheral vehicle is detected by the peripheral vehicle detection section, and
    the transmission determination section is further configured to compare the travel time of the vehicle with the travel time of the peripheral vehicle and determine to send the emergency signal to the peripheral vehicle when the travel time of the vehicle is shorter than the travel time of the peripheral vehicle.

4. The emergency reporting device as recited in claim 1, wherein
    the travel information of the vehicle is a travel distance of the vehicle from a point where the vehicle exited the last communication area in which the vehicle last traveled until a point where the peripheral vehicle was detected by the peripheral vehicle detection section,
    the travel information of the peripheral vehicle is a travel distance of the peripheral vehicle from a point where the peripheral vehicle exited the last communication area in which the peripheral vehicle last traveled until the point where the peripheral vehicle was detected by the peripheral vehicle detection section, and
    the transmission determination section is further configured to compare the travel distance of the vehicle and the travel distance of the peripheral vehicle and determine to send the emergency signal to the peripheral vehicle when the travel distance of the vehicle is shorter than the travel distance of the peripheral vehicle.

5. The emergency reporting device as recited in claim 1, wherein
    the travel information acquisition section further includes a vehicle position detection section configured and arranged to detect a current position of the vehicle;
    the emergency signal control unit further includes a communication area information storage section configured to store information on a plurality of communication areas of the base stations, and a distance calculation section configured to calculate a distance between the current position of the vehicle and one of the communication areas of the base stations that is in a traveling direction of the vehicle based on the current position of the vehicle and the information on the communication areas of the base stations stored by the communication area information storage section, and the distance calculation section being further configured to calculate a distance between an estimated position of the peripheral vehicle estimated based on the current position of the vehicle and one of the communication areas of the base stations that is in a traveling direction of the peripheral vehicle based on the estimated position of the peripheral vehicle and the information on the communication areas of the base stations stored in the communication area information storage section;
    the transmission determination section is further configured to determine whether or not to send the emergency signal to the peripheral vehicle based on the distance between the current position of the vehicle and the one of the communication areas that is in the traveling direction of the vehicle and the distance between the estimated position of the peripheral vehicle and the one of the communication areas that is in the traveling direction of the peripheral vehicle calculated by the distance calculation section; and the vehicle communication section is further configured to send the emergency signal to the peripheral vehicle when the transmission determination section determines to send the emergency signal to the peripheral vehicle, and not to send the emergency signal to the peripheral vehicle when the transmission determination section determines not to send the emergency signal to the peripheral vehicle.

6. The emergency reporting device as recited in claim 5, wherein the emergency signal control unit further includes a roadmap storage section configured to store roadmap information, the vehicle communication section being further configured to receive destination information including a destination of the peripheral vehicle from the peripheral vehicle, the one of the communication areas that is in the traveling direction of the peripheral vehicle being on a travel route from the estimated position of the peripheral vehicle up to the destination of the peripheral vehicle obtained based on the destination of the peripheral vehicle and the roadmap information stored in the roadmap storage section as well as the estimated position of the peripheral vehicle and the information on the communication areas of the base stations stored in the communication area information storage section.

7. The emergency reporting device as recited in claim 1, wherein the emergency signal control unit further includes a roadmap storage section configured to store roadmap information, a communication area information storage section configured to store information on a plurality of communication areas of the base stations;

a vehicle position detection section configured and arranged to detect a position of the vehicle; and a guide route setting section configured to set a guide route from the position of the vehicle to a destination of the vehicle based on the roadmap information stored in the roadmap storage section, the guide route setting section being further configured to reset the guide route such that the vehicle passes within one of the communication areas of the base stations when the vehicle receives the emergency signal based on the information on the communication areas stored in the communication area information storage section.

8. The emergency reporting device as recited in claim 1, wherein the emergency signal control unit further includes a traffic information reception section configured and arranged to receive traffic condition information indicative of conditions that affects vehicle travel time.

9. The emergency reporting device as recited in claim 2, wherein the emergency signal control unit further includes a traffic information reception section configured and arranged to receive traffic condition information indicative of conditions that affects vehicle travel time.

10. The emergency reporting device as recited in claim 3, wherein the emergency signal control unit further includes a traffic information reception section configured and arranged to receive traffic condition information indicative of conditions that affects vehicle travel time.

11. The emergency reporting device as recited in claim 4, wherein the emergency signal control unit further includes a traffic information reception section configured and arranged to receive traffic condition information indicative of conditions that affects vehicle travel time.

12. The emergency reporting device as recited in claim 5, wherein the emergency signal control unit further includes a traffic information reception section configured and arranged to receive traffic condition information indicative of conditions that affects vehicle travel time.

13. The emergency reporting device as recited in claim 7, wherein the emergency signal control unit further includes a traffic information reception section configured to receive traffic condition information indicative of conditions that affects vehicle travel time.

14. The emergency reporting device as recited in claim 8, wherein the traffic information reception section is further configured to receive road closure information indicative of locations where traffic road closures is occurring as the traffic condition information, the transmission determination section being further configured to determine whether or not to send the emergency signal to the peripheral vehicle based on the road closure information received by the traffic information reception section.

15. The emergency reporting device as recited in claim 8, wherein the traffic information reception section is further configured to receive traffic jam information indicative of locations where traffic jams are occurring as the traffic condition information, the transmission determination section being further configured and arranged to determine whether or not to send the emergency signal to the peripheral vehicle based on the traffic jam information received by the traffic information reception section.

16. An emergency reporting device installed in a vehicle for sending an emergency signal to one of a plurality of base stations comprising:

a roadmap storage section configured to store roadmap information, a communication area information storage section configured to store information on a plurality of communication areas of the base stations;

a vehicle position detection section configured and arranged to detect a position of the vehicle; and a guide route setting section configured to set a guide route from the position of the vehicle to a destination of the vehicle based on the roadmap information stored in the roadmap storage section, the guide route setting section being further configured to reset the guide route such that the vehicle passes within one of the communication areas of the base stations when the vehicle receives the emergency signal based on the information on the communication areas stored in the communication area information storage section.

17. A method of selectively sending an emergency signal from a vehicle, comprising:

selectively sending an emergency signal to one of a plurality of base stations after entering a communication area of the one of the base stations with the emergency signal;

detecting a peripheral vehicle equipped with an emergency reporting device in a peripheral area of the vehicle;

acquiring travel information of the vehicle and the peripheral vehicle;

determining whether or not to send the emergency signal to the peripheral vehicle based on a comparison of the travel information of the vehicle and the travel information of the peripheral vehicle; and selectively sending the emergency signal to the peripheral vehicle based on a determination result based on the comparison of the travel information of the vehicle and the travel information of the peripheral vehicle.

18. An emergency reporting device to be installed in a vehicle comprising:

base station communicating means for communicating with one of a plurality of base stations and sending an emergency signal to the one of the base stations after entering a communication area of the one of the base stations with the emergency signal;

peripheral vehicle detecting means for detecting a peripheral vehicle equipped with the emergency reporting device in a peripheral area of the vehicle;

travel information acquiring means for acquiring travel information of the vehicle and the peripheral vehicle;

transmission determination means for determining whether or not to send the emergency signal to the peripheral vehicle based on a comparison of the travel information of the vehicle and the travel information of the peripheral vehicle; and vehicle communication means for sending the emergency signal to the peripheral vehicle based on a determination result of the transmission determination means.

* * * * *